United States Patent [19]
Meyer et al.

[11] 3,836,314
[45] Sept. 17, 1974

[54] MOLD AND CLAMP FOR USE IN AN AUTOMATIC CASTING MACHINE

[75] Inventors: Robert W. Meyer, South Elgin; Robert G. Swanson, Dundee, both of Ill.

[73] Assignee: M and S Engineering, Inc., Dundee, Ill.

[22] Filed: July 6, 1973

[21] Appl. No.: 377,119

Related U.S. Application Data

[62] Division of Ser. No. 100,718, Dec. 22, 1970, Pat. No. 3,801,255.

[52] U.S. Cl.............. 425/451.9, 249/164, 249/167
[51] Int. Cl............................................ B29c 1/16
[58] Field of Search......... 425/450 C; 249/139, 164, 249/167

[56] References Cited
UNITED STATES PATENTS

| | | | |
|---|---|---|---|
| 1,837,452 | 12/1931 | LeMay | 249/164 |
| 1,864,242 | 6/1932 | Guyot | 249/167 |
| 3,768,952 | 10/1973 | Connolly | 425/450 C |

FOREIGN PATENTS OR APPLICATIONS

| | | | |
|---|---|---|---|
| 1,276,895 | 9/1968 | Germany | 425/450 C |

Primary Examiner—J. Spencer Overholser
Assistant Examiner—David S. Safran
Attorney, Agent, or Firm—Prangley, Dithmar, Vogel, Sandler & Stotland

[57] ABSTRACT

An automatic casting machine having means for automatically and simultaneously introducing a casting material into a plurality of molds, filling means for automatically filling the molds to a predetermined level, mold carrying means adjustable to carry molds of different sizes, means for inverting the mold carrying means and the molds carried thereby to drain excess casting material therefrom, means for uprighting the mold carrying means and conveyor mechanism for transporting the mold carrying means from the filling means through a wall building station to the inverting means and thereafter through a draining station to the uprighting means and thereafter through a parts drying station to a mold unloading station and then to a mold conditioning station.

8 Claims, 15 Drawing Figures

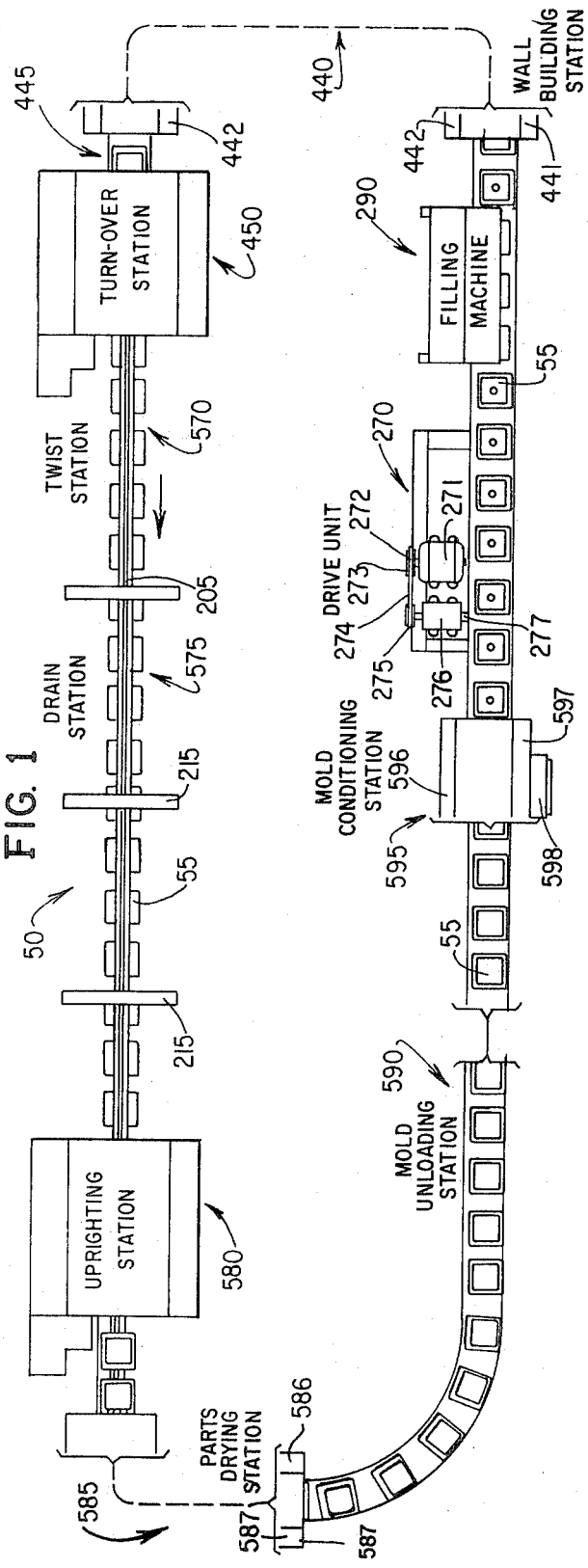
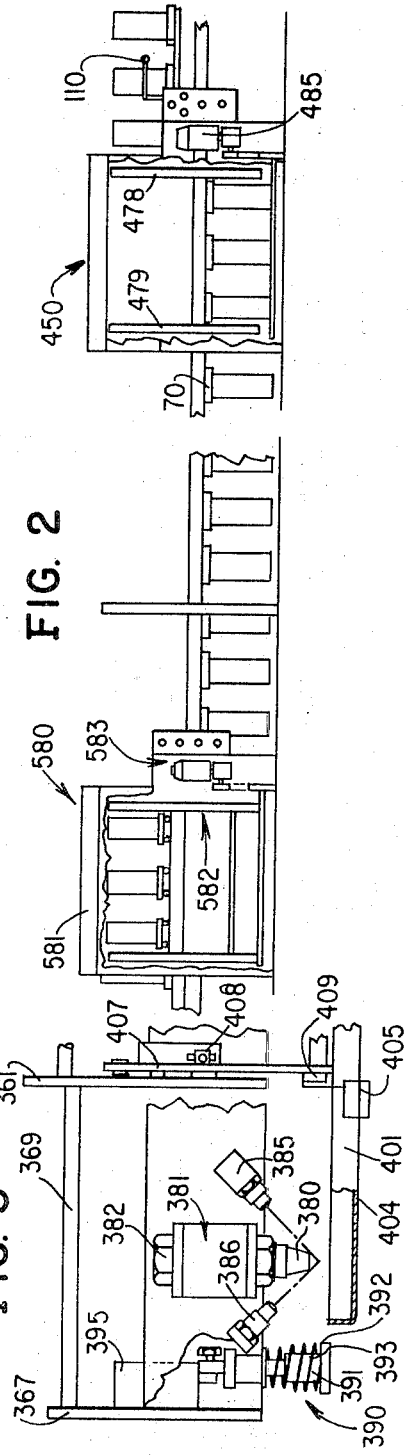
FIG. 1
FIG. 2
FIG. 3

MOLD AND CLAMP FOR USE IN AN AUTOMATIC CASTING MACHINE

This is a division of application Ser. No. 100,718, filed Dec. 22, 1970, now U.S. Pat. No. 3,801,255.

The present invention relates to an automatic casting machine and more specifically to a casting machine in which a plurality of molds are transported to a filling station in which the molds are automatically (1) filled to a predetermined level with a casting material, (2) transported to means for inverting the molds to drain excess casting material therefrom, (3) uprighted and (4) thereafter transported to a station in which the casting is removed from the mold.

An important object of the present invention is to provide an automatic casting system comprising a mold for receiving a casting material therein to form a casting, filling means for dispensing the casting material into the mold, means for draining excess casting material from the mold after the casting has been formed therein, and mold carrying means automatically for transporting the mold to the filling means and positioning the mold in the material-receiving position with respect to the filling means and for thereafter transporting the filled mold to the draining means.

Another object of the present invention is to provide, in an automatic casting system of the type set forth, means for inverting the mold after the casting has been formed therein thereby to drain excess casting material therefrom and means for uprighting the mold after the excess casting material has been drained therefrom.

Another object of the present invention is to provide, in an automatic casting system of the type set forth, means for forming a solid ceramic casting having a predetermined wall thickness.

Still another object of the present invention is to provide, in an automatic casting system of the type set forth, apparatus for accommodating molds of different sizes.

Still another object of the present invention is to provide an assembly of a multiple-part mold and mold clamp therefor for use in an automatic casting machine of the type set forth, the multiple-part mold having a casting-holding condition thereof and a casting-releasing condition thereof, at least one part of the mold being fixedly secured to the mold carrying means and another part of the mold being movable between a sealed position with respect to the fixed part of the mold to place the mold in the casting-holding condition thereof and an unsealed position with respect to the fixed part of the mold to place the mold in its casting-releasing condition thereof, the mold clamp having tensioning means and being shiftable between a closed position and an opened position thereof with respect to the other part of the mold, the mold clamp in the closed position thereof being tightly tensioned against the other part of the mold to seal the parts of the mold, the mold clamp in the opened position thereof being spaced from the other part of the mold, shifting of the mold clamp from the closed position thereof to the open position thereof operable to effect change of the mold from the casting-holding condition thereof to the casting-releasing condition thereof.

A further object of the present invention is to provide for use in a casting system of the type set forth an assembly of a multiple-part mold, a mold clamp and a mold carrier, the mold carrier having an L-shaped mold support connected to the conveyor means, one part of the mold being fixedly secured to the vertical leg of the L-shaped mold support and the other part of the mold being movable between a sealed position with respect to the one part of the mold to place the mold in a casting-holding condition thereof and an unsealed position with respect to the one part of the mold to place the mold in the casting-releasing condition thereof, and a mold clamp of the type hereinbefore set forth.

A further object of the present invention is to provide a filling mechanism for dispensing casting material into molds placed in a casting material-receiving position with respect to the filling mechanism, the filling mechanism comprising a frame, a filling head connected to the frame, motor means for moving the filling head with respect to the frame between a storage position and a dispensing position thereof, a nozzle carried by the head for directing casting material into a mold positioned in the casting material-receiving position thereof, sensing mechanism for sensing the level of casting material in the mold and for producing a signal when the level reaches a predetermined value, and control mechanism for holding flow of casting material through the nozzle in response to a signal from the sensing mechanism to fill each of the molds to a predetermined level and for actuating the motor means in response to the signal from the sensing mechanism to move the filling head from the dispensing position thereof to the storing position thereof to ready the filling heads for placement of another mold into the casting material-receiving position thereof.

A still further object of the present invention is to provide an inverting mechanism for use in an automatic casting system of the type set forth in which the inverting mechanism comprises a rotor assembly, means carried by the rotor assembly for maintaining the molds transported thereto by the conveyor means fixed with respect to the rotor assembly during rotation thereof, and motor means for rotating the rotor assembly and the molds carried thereby to invert the molds and drain excess casting material therefrom.

Another object of the present invention is to provide for use in a casting system of the type set forth a combination of means for inverting a plurality of molds filled with a casting material to dump excess casting material therefrom and a conveyor system for transporting the molds in the upright position thereof to the inverting means and for transporting the molds in the inverted position thereof away from the inverting means, the conveyor system comprising four pairs of rails and a trolley assembly connecting each of the molds with the rails, the four pairs of rails forming a cruciform and vertical cross section, each of the trolley assemblies including a housing having four sets of wheels mounted thereon, each of the sets of wheels being spaced 90° from the adjacent set of wheels and adapted to fit between the one pair of the four pairs of rails, the rotor mechanism of the inverting means including four pairs of rails forming a cruciform in vertical cross section and being complementary to the conveyor rails and being positioned near thereto to receive the trolley assembly and the molds carried thereby from the conveyor rail, and means for rotating the rotor mechanism to invert a mold carried thereby and to drain excess casting material from the molds.

A further object of the present invention is to provide apparatus for making hollow or solid ware of ceramic, plastic, plaster and other materials where the raw material is in the liquid state.

A still further object of the present invention is to increase the mold life, improve the ware quality and to provide apparatus capable of handling a variety of mold sizes quickly and easily.

The invention, both as to its organization and method of operation, together with further objects and advantages thereof, will best be understood by reference to the following specification taken in connection with the accompanying drawings in which:

FIG. 1 is a diagrammatic view of the automatic casting machine of the present invention particularly showing the spatial relationship of the various parts thereof;

FIG. 2 is a side elevational view of the inverting station and the uprighting station;

FIG. 3 is a front elevational view partly in section of a portion of the filling head of the filling station;

Figure 4:
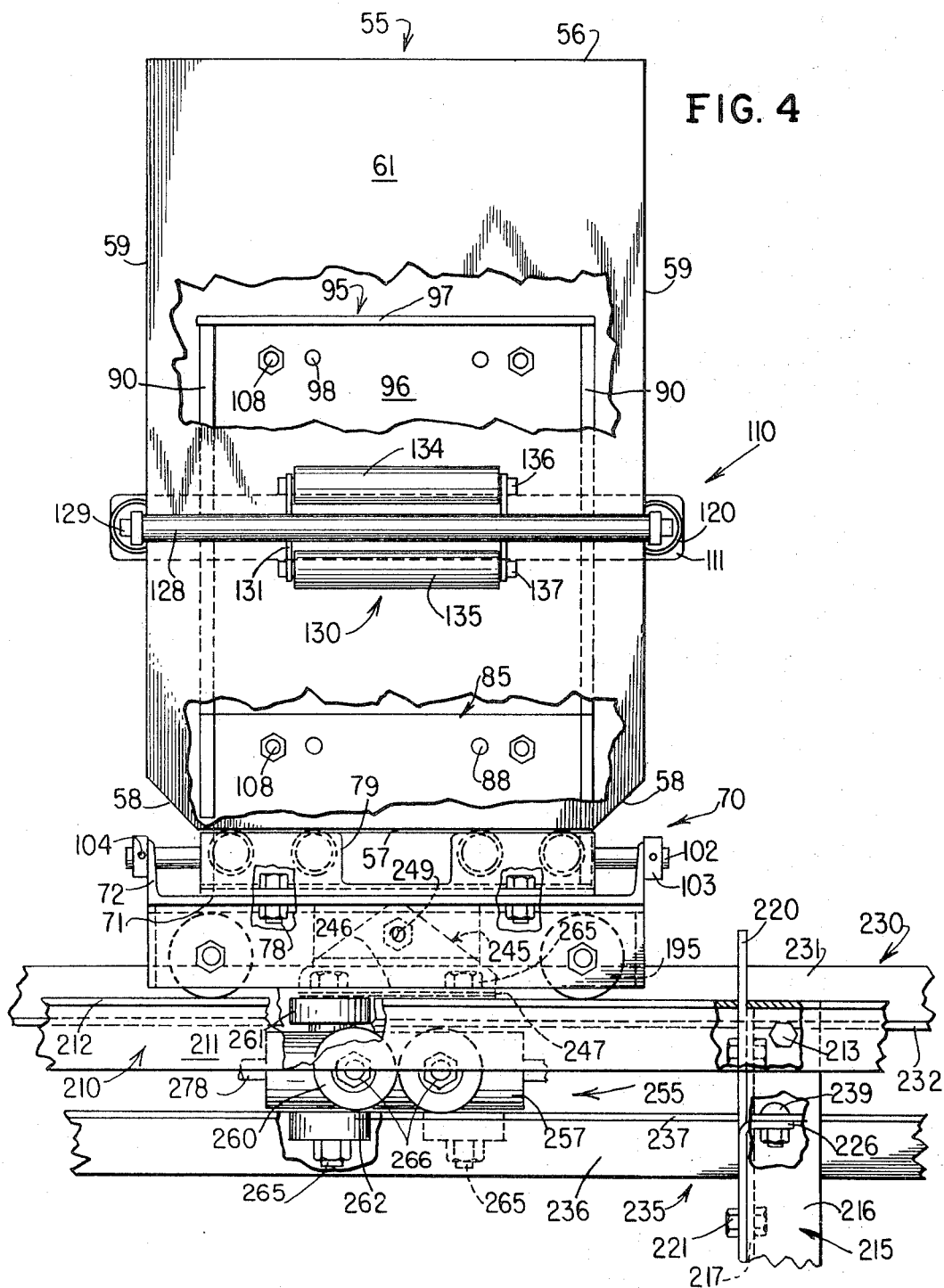
FIG. 4 is a front elevational view partly in section and partly broken away of a mold mounted on the mold carrying means and maintained thereon by one embodiment of the mold clamping means and showing the relationship between the mold carrying means and the conveyor system.

There is hereinafter disclosed and particularly shown in FIGS. 1 and 2 an automatic casting machine 50 in which a plurality of molds 55 each supported by a mold carrier 70 and maintained thereon by mold clamping means 110 or 150 are transported along a predetermined path on a conveyor system 205 driven by a drive unit 270. The molds 55 are first transported to a filling station 290 in which a liquid casting material or slip is introduced into the mold and thereafter the molds 55 are transported to a wall building station 440 where the casting is formed within the molds 55. From the wall building station 440 the molds are transported to a twisting station 445 in which the molds 55 are tilted a few degrees from the vertical and thereafter to an inverting station 450 wherein the molds 55 are inverted to dump the excess liquid casting material therefrom. When the molds 55 exit from the inverting station 450 they pass through another twisting station 570 and into a draining station 575. From the draining station 575 the molds 55 are thereafter transported to an uprighting station 580 wherein the molds 55 are returned to an upright position and therefrom they are transported to a parts drying station 585 and thereafter to a mold unloading station 590. In the mold unloading station 590 the mold clamping means 110 or 150 are moved from the closed position thereof to the opened position thereof to allow the finished casting to be removed from the molds 55. The molds 55 are then reassembled and the mold clamping means 110 or 150 are moved to the closed position thereof, the molds 55 thereby being in the material-receiving condition thereof, the molds 55 thereafter being transported through a mold conditioning station 595 and then to the filling station 290.

With reference particularly to FIGS. 4 and 11 to 13, there is disclosed a typical mold 55 adapted for use with the automatic casting system hereof, the mold 55 being generally rectangular in cross section and having a top surface 56, a bottom surface 57 and upwardly inclined surfaces 58 interconnecting the bottom surface 57 with two opposed side surfaces 59, and also interconnecting an opposed rear surface 61 and a front surface 62 of the mold. The mold 55 is hollow and has an opening 63 in the top surface 56 thereof through which liquid casting material is poured to fill the mold 55. The molds 55 described herein are two-piece molds, each having a front half 65 and a rear half 66; however, molds of more than two parts can be used with the mold clamps and the automatic casting system described herein.

Each mold 55 has a material-receiving or casting-holding condition in which the front half 65 and the rear half 66 are in sealed relationship to each other so as to retain therein liquid casting material in order to form a casting therein, and a casting-releasing condition in which the front half 65 and the rear half 66 are not in sealed relationship one to another and a casting within the mold 55 may be removed by separation of the two halves. The mold 55 may be made of any art-recognized material, plaster of paris being the preferred embodiment. The mold pieces preferably are provided with complementary dowels 67 and cavaties 68 (FIG. 13) to insure proper mating and alignment of the mold parts in the closed position.

Figure 6:
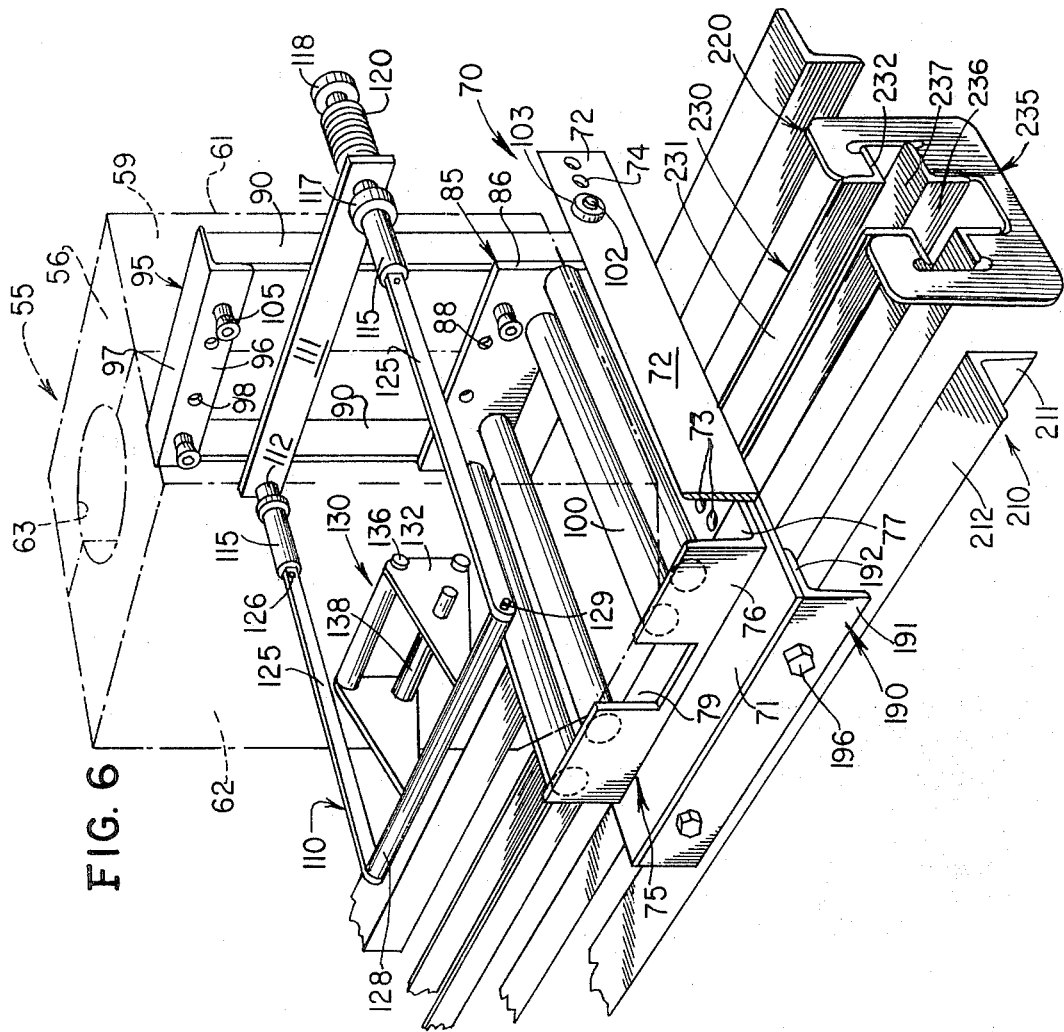
FIG. 6 is a perspective view of one embodiment of the mold clamping means and certain portions of the mold carrying means and the conveyor system.
Figure 7:
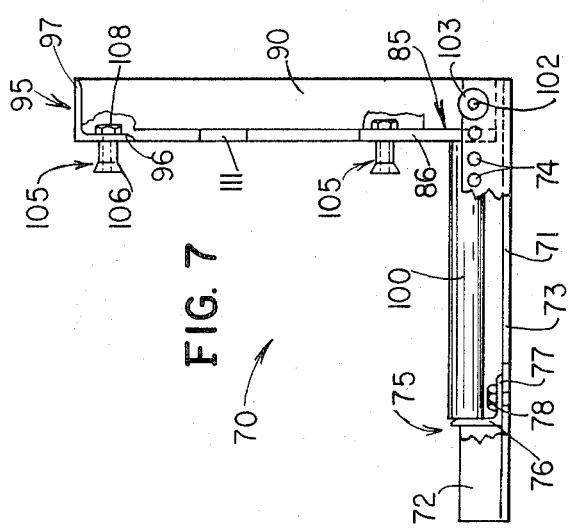
FIG. 7 is a side elevational view partly broken away of the mold carrying means.

Each mold 55 is maintained on an associated mold carrier 70, the mold carriers 70, as particularly shown in FIGS. 4, 6, 7 and 11 to 13, each including a flat platform 71 having the ends thereof formed into two parallel spacedapart end plates 72. A front angle plate 75 is positioned on the top of the platform 71 near the lefthand end thereof as seen in FIGS. 6 and 7, the angle plate 75 including a vertical leg 76 and a horizontal leg 77, the horizontal leg 77 being in contact with the platform 71. The angle plate 75 is mounted on the platform 71 by means of spaced fasteners 78 (one only shown) which extend through apertures (not shown) in the horizontal leg 77 and through one of a series of apertures 73 in the platform 71, the apertures 73 being in the form of two spaced-apart parallel rows, thereby to permit adjustment of the angle plate 75 with respect to the lefthandmost edge of the platform 71. The vertical leg 76 of the front angle plate 75 has a cutout 79 in the center thereof.

The mold carriers 70 each include a vertically disposed lower back plate 85 having a plurality of horizontally spaced apertures 88 therein, the apertures 88 being provided for a purpose hereinafter to be explained. Two parallel spaced-apart vertical standards 90 are connected to the respective ends of the plate 85, such as by welding, and extend upwardly and away from the platform 71. Mounted on the upper ends of the vertical standards 90 is an upper back angle plate 95, the upper back angle plate 95 having a vertical leg 96 and a horizontal leg 97, the vertical leg 96 having therein a plurality of apertures 98 in vertical alignment with the apertures 88 in the lower plate 85.

There is further provided a plurality of mold support bars 100 suitably connected between the vertical leg 76 of the front angle plate 75 and the lower rear plate 85, thereby to form into one L-shaped unit the front angle plate 75, the lower rear plate 85, the standards 90 and the upper rear angle plate 95. The rear lower plate 85 is maintained in position relative to the platform 71 by a rod 102 which extends through one of a series of apertures 74 in each of the end plates 72, the rod 102 having special collars 103 outside of the end plates 72 and fixedly secured to the rod 102 by set screws 104 therein thereby to maintain the rod 102 in fixed relationship to the platform 71.

Figure 13:
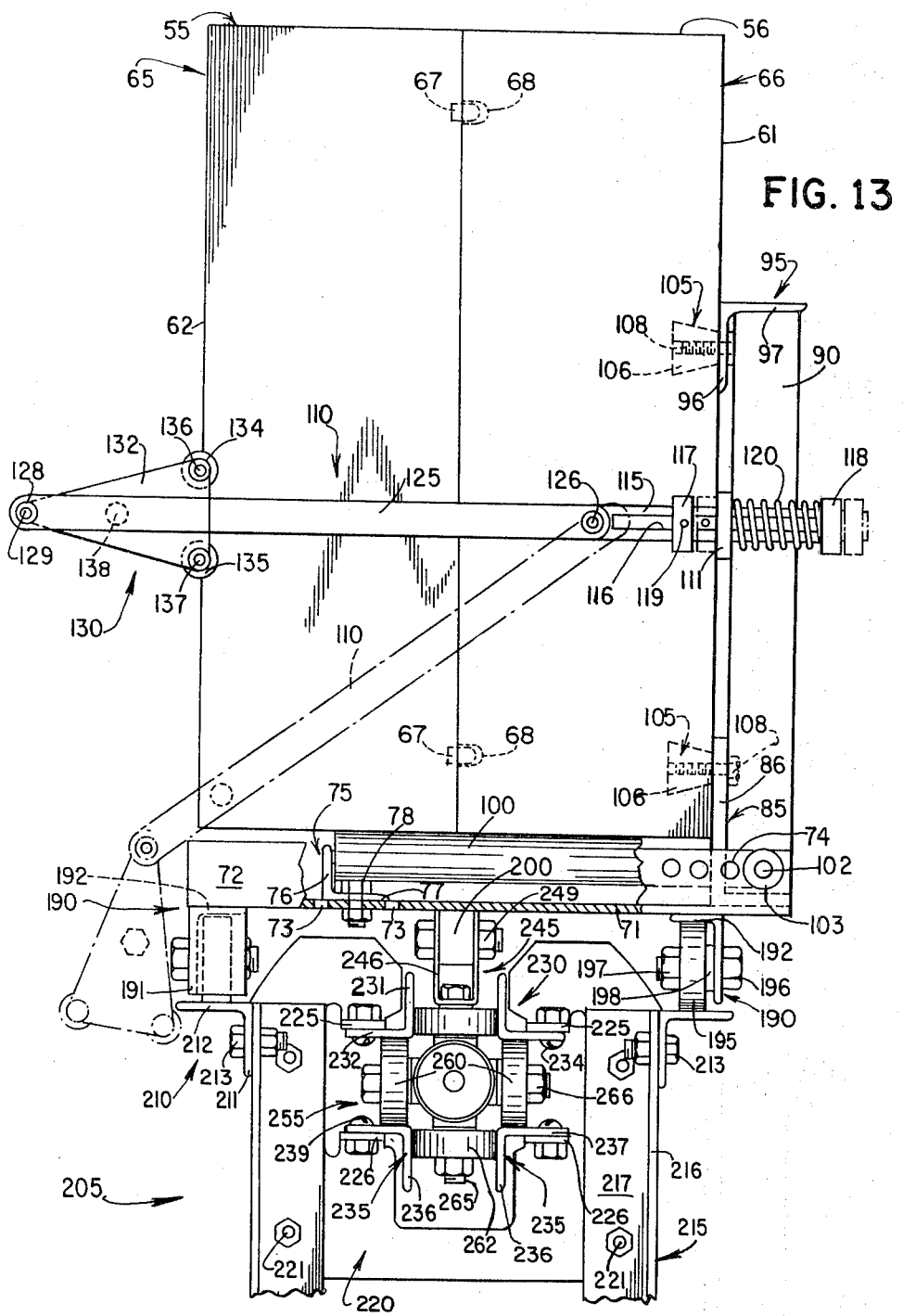
FIG. 13 is a side elevational view of a mold carried by the mold carrying means and maintained thereon by an embodiment of the mold clamping means and particularly showing the relationship thereof to the conveyor mechanism.

The mold carriers 70 each are adjustable to carry thereon molds 55 of various sizes, the adjustment of the mold carriers 70 being provided by the series of apertures 74 in the end plates 72 through which extend the rod 102 in combination with the series of apertures 73 in the platform 71 through which extend the fasteners 78 for fixedly securing the front angle plate 75 to the platform 71. The combination of the front angle plate 75, the lower rear plate 85, the vertical standards 90, the upper rear angle plate 95 and the support bars 100 move as a unit to the left or to the right along the platform 71 as seen in FIG. 13, thereby to position molds 55 of different sizes in the center of the mold carrier 70.

With this construction, the unit defined by the front plate 75, the support bars 100, the rear plate 85, the standards 90 and the upper angle plate 95 also is rotatably mounted relative to the platform 71. Such movement can be effected by removal of the fasteners 78.

The rear half 66 of the mold 55 is fixedly connected to the associated mold carrier 70 by means of a plurality of fasteners 105, each fastener including an insert 106 of plastic or other suitable material imbedded within the rear surface 61 of the mold 55 and a threaded fastener 108 passing through an appropriate one of the apertures 88 in the lower rear plate 85 or one of the apertures 98 in the upper rear angle plate 95 and into the insert 106 thereby fixedly to secure the rear half 66 of the mold 55 to the mold carrier 70.

The mold 55 is maintained in the casting-holding condition thereof by means of a mold clamp, there being two embodiments of mold clamps hereinafter described. As the molds 55 may be about 12 inches to about 20 inches high having a base from about 7¾ inches to about 12 inches square, it is seen that more than one embodiment of the mold clamp preferably is provided in order fixedly to maintain both the smaller sized and the larger sized molds 55 in the casting-holding condition thereof.

With particular reference to the mold clamp 110 shown in FIGS. 4, 6 and 13, there is disclosed a support bar 111 extending normal to the vertical standards 90 of the associated mold carrier 70 and fixedly secured thereto such as by welding, the support bar 111 having two spaced-apart apertures 112 therein. The mold clamp 110 further includes two parallel spaced-apart rods or short arms 115, each of the arms 115 being positioned to extend through one of the apertures 112 in the support bar 111. Each of the arms 115 has a groove 116 cut therethrough, each groove 116 extending from the forward end of the arm 115 rearwardly (to the right as seen in FIG. 13) to a point near the outer end of the arm 115. A collar 117 is fixedly mounted on the arm 115 as by set screw 119 and is positioned to the left of the support bar 111, that is toward the front of the mold carrier 70. A second collar 118 is fixedly secured to the arm 115 near the other end thereof, that is toward the right as seen in FIG. 13, the collar 118 cooperating with the support bar 111 to maintain a tensioning member in the form of a coil spring 120 in compression therebetween, the coil spring 120 being positioned about the arm 115 and urging the arm 115 to the right as seen in FIG. 13. The mold clamp 110 further is provided with two parallel spaced-apart hinge members in the form of longer arms or hinge bars 125, the hinge bars 125 each being pivoted to the left-handmost end of the associated arm 115 by a hinge pin 126. The ends of the hinge bars 125 away from the hinge pins 126 are joined by a transverse connecting member in the form of a roll pin 128, the connecting member 128 having stub shafts 129 on each end thereof and extending through appropriate apertures in the adjacent bars 125, thereby rotatably to mount the connecting member 128 between the two bars 125.

Locking means in the form of a roller or lock bar assembly 130 fixedly is mounted to the connecting member 128 to rotate therewith, the roller assembly 130 including two parallel spaced-apart triangularly shaped plates or brackets 132 with the apex of the triangle being fixedly secured to the connecting member 128. An upper roller 134 is rotatably mounted between the roller brackets 132, the upper roller 134 having stub shafts 136 extending through the associated brackets 132. A lower roller 135 rotatably is mounted between the roller brackets 132 in the other corner thereof, the lower roller 135 having stub shafts 137 on either end thereof extending through the associated roller brackets 132. Finally, the roller assembly 130 is provided with a handle 138 fixedly secured to the roller brackets 132 and being positioned parallel to the upper roller 134 and the lower roller 135 and approximately midway between the upper roller 134, the lower roller 135 and the connecting member 128.

As previously explained, the mold carrier 70 is adjustable to accommodate molds of different sizes. The mold clamp 110 associated with the mold carrier 70 is likewise adjustable by means of collars 117 and 118 to accommodate molds 55 of various sizes. For molds 55 of smaller depth than the one illustrated in FIG. 13, the collar 118 may be moved to the left so as to draw the roller assembly 130 to the right, this necessitating movement of the collar 117 to the left to provide room for the spring 120 to expand. The full-line illustration of the mold clamp 110 shows the clamp in the closed position thereof in which the front half 65 and the rear half 66 of the mold 55 are maintained in sealed relation one to the other such that the mold 55 is in the casting-holding condition thereof. The phantom-line illustration of the mold clamp 110 shows the clamp in the opened position thereof in which the front half 65 and the rear half 66 of the mold 55 are maintained in an unrestricted relationship such that the mold 55 is in position to have the casting removed therefrom and is in the casting-releasing condition thereof. It is here noted that when the mold clamp 110 is in the opened position thereof, the front half 65 of the mold 55 easily may be tilted to the left or away from the rear half 66 of the mold 55 thereby to facilitate removal of a casting from the mold 55.

As best seen in FIG. 13, when the mold clamp 110 is in the locked position, the short arms 115, the hinge members or bars 125, and the connecting member 128 all lie in a common plane, with the rollers or lock bars 134 and 135 in a load-bearing position relative to the mold 55, the spring 120 serving to maintain adequate force on the aforesaid parts so as to maintain them in a stable condition. In the locked position, the lock bars or rollers 134 and 135 lie on opposite sides of the plane passing through the arms 115, the hinge members 125 and the connecting member 128, or in an "over-center" position.

In order to open or unlock the clamp 110, it is necessary to move the lock bars or rollers 134 and 135 over center, or beyond the common plane. In order to open the clamp 110, it is necessary to overcome the force then being exerted by the spring in holding the parts in the stable condition. To accomplish this, the lock bars or rollers 134 and 135 may be moved vertically along the outside face 62 of the mold and, at the same time, a rotational force is applied to the handle 138 by the operator, by placing the palm of his hand on the connecting member 128 and the fingers on the handle 138 and then applying such rotational force. A typical torque requirement in order to accomplish the release action is on the order of 5 to 8 foot-pounds at the pivot point.

As rotation occurs, it will be appreciated that as either the roller 134 or 135 passes through the common plane it causes the hinge member 125 to move toward the left as illustrated in FIG. 13, thereby applying a greater compressive force on the spring 120. As soon as one or the other of the rollers 134 and 135 passes through the previously described common plane, the compression spring causes the arms 115 and hinge member 125 to snap back to the stable position thereof, wherein the collar 117 abuts the support bar 111.

It will be appreciated from the foregoing that operation of the mold clamp 110 is easily accomplished by the operator when it is desirable to separate the mold parts in order to remove a casting therefrom, while, at the same time, the mold clamp 110 provides more than adequate restraining force on the free mold part to hold the source in place during the casting operations.

In a typical example, the mold clamp 110 may have the approximate following dimensions: The short arm members 115 are about 6⅜ inches long and about ¾ inch in diameter, with the slot 116 therein being approximately 5¼ inches long; the hinge members 125 are approximately 10¾ inches long (at the pivot points) for molds between about 7 ¾ inches and 9 inches in depth; while such members 125 may be about 13½ inches long (at the pivot points) for molds that range from 10½ inches to 12 inches in depth. The roller bracket or plates 132 are about 4 inches long with the openings therein for the lock bars or rollers 134 and 135 being spaced approximately 2 inches on center, and the opening for receiving the handle 138 being approximately 1 15/16 inches from the vertical center line of the openings for the rollers. The connecting member 128 is about 12 3/16 inches long; the handle 138 is about 10 inches long; and the plates 132 are spaced about 5 1/16 inches apart. The rollers 134 and 135 are about 4⅞ inches long and are formed of a two-ply rubber hosing having a ½ inch i.d. by ⅞ inch o.d.; the roller shafts therefor being about 5 inches long. The coil spring is about 2 inches in free length; it is about 1 3/32 inches in o.d. and the wire is about ⅛ inch in diameter, there being three coils to the inch. An axial force of about 79 pounds is required to achieve 1 inch of deflection. The spring is preloaded so that when the clamp is in the unlocked condition, the spring is compressed about ½ inch, or about 40 pounds is being exerted thereby. To achieve locking or unlocking, the arc subscribed by the rollers in passing over the center or common plane causes an additional deflection of about ⅛ inch of the spring.

For molds 55 of larger dimension, more than one roller assembly 130 is needed to provide adequate sealing between the two halves of the mold. To this end there is provided a second embodiment of a mold clamp, designated generally as 150, which embodiment is best illustrated in FIGS. 11 and 12.

Figure 11:
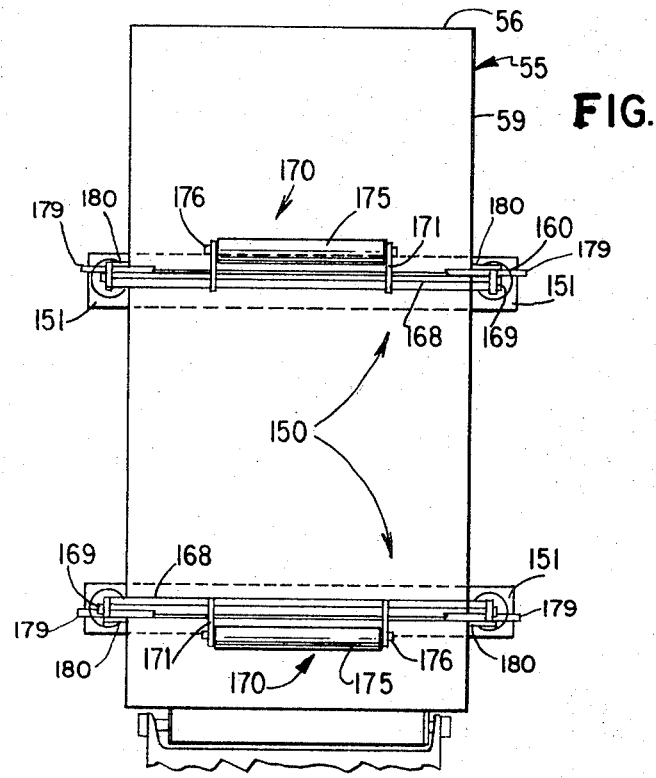
FIG. 11 is a front elevational view of a mold carried by the mold carrying means and maintained thereon by another embodiment of the mold clamping means.
Figure 12:
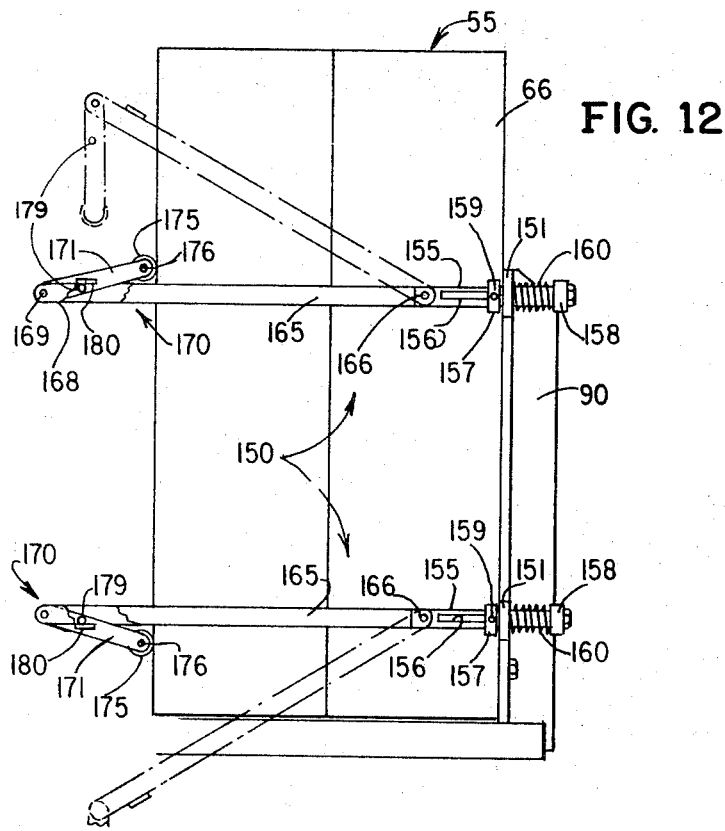
FIG. 12 is a side elevational view of the apparatus shown in FIG. 11.

There is disclosed in FIGS. 11 and 12 a mold clamp 150 including two spaced-apart and parallel support bars 151 extending normal to the vertical standards 90 of the associated mold carrier 70, the support bars 151 being fixedly secured thereto such as by welding and each of the support bars 151 having two spaced-apart apertures (not shown) therein. The mold clamp 150 further includes for each of the support bars 151, two parallel spaced-apart rods or short arms 155, each of the arms 155 being positioned to extend through one of the apertures in each of the support bars 151. Each of the arms 155 has a groove 156 cut therethrough, each groove 156 extending from the forward end of the rod 155 rearwardly (to the right as seen in FIG. 12) to a point near the other end of the arm 155. A collar 157 is fixedly mounted on each of the arms 155 as by a set screw 159 and is positioned to the left of the respective support bar 151, that is toward the front of the mold carrier 70. A second collar 158 is fixedly secured to each of the arms 155 near the other end thereof, that is toward the right as seen in FIG. 12, each collar 158 cooperating with the associated support bar 151 to maintain a coil spring 160 in compression therebetween, each of the coil springs 160 being positioned about a respective one of the arms 155 and urging that arm 155 to the right as seen in FIG. 12.

The mold clamp 150 further is provided with two parallel spaced-apart hinge members in the form of longer arms or hinge bars 165 for each of the support bars 151, each of the hinge bars 165 being pivoted to the left-hand end of an associated one of the arms 155 by appropriate hinge pins 166. To maintain each of the two hinge bars 165 in the same plane, the ends of the hinge bars 165 away from the hinge pins 166 are joined by a transverse connecting member or roll pin 168, each of the connecting members 168 having stub shafts 169 on each end thereof and extending through the adjacent ends of the hinge bars 165, thereby rotatably to mount the connecting member 168 between the ends of the associated hinge bars 165.

A lock bar in the form of a roller assembly 170 fixedly is mounted to each connecting member 168 to rotate therewith, the roller assembly 170 including two spaced-apart roller brackets 171, each of the roller brackets 171 being in the form of an elongated member having an aperture at one end thereof. One end of the roller bracket 171 is fixedly mounted to the connecting member 168 to rotate therewith, as hereinbefore explained, while the other end of the roller brackets 171 have a roller 175 rotatably mounted between the associated ones of the roller brackets 171, each of the rollers 175 having stub shafts 176 on the ends thereof extending through the associated apertures in the roller brackets 171. Each roller assembly also is provided with a shaft 179 extending through the roller brackets 171 and being positioned substantially midway between the connecting member 168 and the roller 175, the shaft 179 acting as a gripping handle for movement of the roller assembly 170. There is further provided a stop bar 180 mounted on each hinge bar 165, the upper hinge bar 165 having the stop bar 180 mounted on the upper side thereof and extending inwardly to contact the handle or shaft 179 when the roller assembly 170 has reached its counter-clockwisemost position with respect to the hinge bar 165. The lowermost hinge bar 165 has the stop bar 180 mounted on the underside thereof where it extends inwardly to contact the handle 179 when the roller assembly 170 is in the clockwisemost position with respect to the bar 165. It is noted that the stop bars 180 contact the handles or shafts 179 to prevent further rotational movement of the roller assemblies 170 relative to the hinge bars 165.

The collars 157 and 158 and coil springs 160 operate in a manner similar to that of the respective collars 117 and 118 and coil springs 120 of the previously described mold clamp 110. The full-line illustration of the mold clamp 150 shows the clamp 150 in the closed position thereof in which the front half 65 and the rear half 66 of the mold 55 are maintained in sealed relationship one to the other, such that the mold is in the casting-holding condition thereof. The phantom-line illustration of the mold clamp 150 shows the clamps in the opened positions thereof, in which the front half 65 and the rear half 66 of the mold 55 are maintained in an unrestricted relationship such that the casting can be removed therefrom. It is here noted that when the mold clamps 150 are in the opened positions thereof, the front half 65 of the mold 55 easily may be tilted to the left or away from the rear half 66 of the mold 55 thereby to facilitate the removal of a casting from the mold 55.

The upper hinge bars 165 of the mold clamp 150 may be moved to the opened position thereof by grasping the connecting member 168 in the palm and applying the fingers to the handle 179 and thereafter rotating the lock bar or roller 175 in the clockwise direction, causing it to pass "over center" relative to the hinge bar 165, arm 155 and connecting member 168, thereby to effect the same snap-action type movement heretofore described in connection with the clamp 110, this thus moves the upper hinge bars 165 from the full-line positions thereof to the phantom-like positions thereof. The lower hinge bars 165 may be moved to the opened position thereof by rotating the handle 179 in the counter-clockwise direction, thereby to move the lower hinge bars 165 from the full-line position thereof to the phantom-line position thereof. To move the mold clamp 150 from the opened position thereof to the closed position thereof the procedure hereinbefore described is reversed, thereby to move the bar 165 from the phantom-line position thereof to the full-line position thereof. It will be understood from the foregoing that in this second embodiment of mold clamp the stop bar in effect acts as a second roller in that, once the roller 176 is moved through the center plane and into the locked condition thereof, the stop bar prevents such roller from continuing on and rotating about to an unlocked condition.

In the second embodiment, the hinge members 165 are about 11⅞ inches long (at the pivot points) in order to accommodate the greater depth mold, while at the same time the clamps are vertically spaced on the mold at approximately 2½ inches and 18½ inches (on center) above the platform 71 of the mold carrier 70, whereas in the embodiment 110 the clamp was disposed approximately 7½ inches from the platform of the mold carrier. It is understood that the coil springs 120 and 160 provide the necessary resilience for the clamps 110 and 150 during movement between the opened and closed positions thereof.

Irrespective of the size of mold 55 employed or whether the mold clamp 110 or the mold clamp 150 is used, the associated mold carriers 70 each have two spaced-apart parallel angle irons 190 fixedly connected to the bottom of the platform 71. One of the angle irons 190 is secured along the edge of the platform 71 away from the vertical standards 90, that is the left-handmost edge of the platform 71 (as seen in FIGS. 6 and 13) and the other angle iron 190 is fixedly secured near the right-handmost edge of the platform 71, that is below the vertical standards 90. Each of the angle irons 190 includes a vertical plate 191 extending downwardly perpendicularly from the platform 71 and a horizontal plate 192 extending parallel and fixed to the bottom of the platform 71. Each of the angle irons 190 has rotatably mounted thereto two wheels 195, each of the wheels 195 being mounted to the vertical plate 191 near the opposite ends thereof by means of a threaded fastener 196 extending through an associated aperture in the vertical plate 191 and through the associated wheel 195. Each of the wheels 195 is maintained about the associated fastener 196 by a washer 198 mounted between the associated vertical plate 191 and the wheel 195 and a nut 197 on the threaded fastener 196 thereby to allow the wheel 195 freely to rotate about the threaded fastener 196. Each of the mold carriers 70 has a center bar 200 (FIG. 13) extending perpendicularly downwardly from the bottom of the platform 71 and positioned midway between the associated wheels 195, the center bar 200 being for a purpose hereinafter explained.

The conveyor system 205 hereinafter described is sold by the "AMERICAN MONORAIL" Division of Fischer Industries under the name of "CHAINLESS" Conveyors, 600 Series, such as illustrated in their brochure S & P Manual AM100. The conveyor system 205 is best illustrated in FIGS. 4, 6 and 13. The conveyor system 205 includes two parallel spaced-apart outer tracks 210, each in the form of an angle plate having a vertical leg 211 and a horizontal leg 212. Each of the outer tracks 210 is fixedly secured by suitable fasteners 213 to the longitudinally extending plate 216 of a plurality of spaced-apart struts 215, the struts 215 being spaced apart along the conveyor system 205 to support the same and each including a longitudinally extending plate 216 and a transversely extending plate 217. As may be seen by reference to FIG. 1, the conveyor system 205 forms a closed path generally oval in shape with the struts 215 being spaced apart therealong to provide sufficient support therefor. Mounted to each of the struts 215 is a support bracket 220, the support brackets 220 being generally U-shaped and mounted to the transverse plates 217 of the associated strut 215 by suitable fasteners 221. Each of the support brackets 220 has two spaced-apart upper lugs 225 positioned between the ends of the transversely extending plates 217 of the associated strut 215, the upper lugs 225 extending parallel to the direction of the travel of the molds 55. Each of the support brackets 220 has two spaced-apart lower lugs 226 positioned between the ends of the transversely extending plates 217 of the associated strut 215, the lower lugs 226 extending parallel to the direction of travel of the molds 55.

Two spaced-apart parallel inner upper tracks 230, each in the form of an L-shaped plate having a vertical leg 231 and a horizontal leg 232 are fastened to the associated upper lug 225 of the support brackets 220 by means of fasteners 234, the tracks 230 extending parallel to the outer tracks 210 for the entire length of the conveyor 205. Two parallel spaced-apart inner lower tracks 235, each in the form of an L-shaped plate having a vertical leg 236 and a horizontal leg 237, are fastened to the associated lower lug 226 of the support brackets 220 by means of fasteners 239, the tracks 235 extending parallel to the outer tracks 210 for the entire length of the conveyor 205. A clevis 245 having two spaced-apart triangular side plates 246 interconnected by a bight 247 is secured to the center bar 200 of each mold carrier 70 by a fastener 249 extending through aligned apertures (not shown) in the triangular side plates 246 and the center bar 200, the clevis 245 forming a part of the connection between each of the mold carriers 70 and the conveyor system 205.

The conveyor system 205 is provided with a plurality of trolley assemblies 255, there being one trolley assembly 255 for each of the plurality of mold carriers 70. Each of the trolley assemblies 255 includes a hollow cylindrical body 257 (FIG. 4) having mounted thereon a plurality of wheels as follows: four wheels 260 are mounted on the cylindrical body 257, two on each opposite side thereof, the wheels 260 being retained between the horizontal legs 232 of the inner upper tracks 230 and the horizontal legs 237 of the inner lower tracks 235; two wheels 261 are mounted on the upper surface of the cylindrical body 257, so that they are retained between the vertical legs 231 of the inner upper tracks 230; and two wheels 262 are mounted on the lower surface of the cylindrical body 257, so that they are retained between the vertical legs 236 of the inner lower tracks 235; the wheels 261 and 262 are mounted on the cylindrical body 257 by means of threaded fasteners 265 extending through the bight 247 of the associated clevis 245, through the wheel 261, through the cylindrical body 257, and through the wheel 262; the wheels 260 are mounted on the cylindrical body 257 by means of fasteners 266 extending through one of the wheels 260, the body 257 and another wheel 260. Each of the trolley assemblies 255 is connected one to another by connecting rods 278, each connecting rod 278 terminating in a ball (not shown) housed in a ball socket formed in each end of the associated cylindrical body 257.

As particularly seen in FIG. 1, there is also provided a drive mechanism 270 for the conveyor 205, the drive mechanism 270 including a motor 271 having a drive shaft 272 extending therefrom with a drive wheel 273 mounted thereon. A belt 274 interconnects the drive wheel 273 mounted thereon. A belt 274 interconnects the drive wheel 273 with a driven wheel 275 mounted to a gear reducer 276, the gear reducer 276 having an output shaft 277 extending therefrom in driving relationship with the trolley assemblies 255 of the conveyor 205, thereby to drive the trolleys 255 in a counterclockwise direction, as seen in FIG. 1 along the closed path hereinbefore described.

As seen from the drawings, the conveyor system 205 provides support for the plurality of mold carriers 70, each of the mold carriers 70 riding with the wheels 195 thereof on the horizontal leg 212 of the outer tracks 210. The conveyor system 205 provides transportation of the mold carrier 70 along the closed path hereinbefore described by means of the drive mechanism 270 which propells the individual trolley assemblies 255 along the closed path, the mold carriers 70 being connected to the trolley assemblies 255 by means of the center bar 200 and clevis 245. The construction of the upper inner tracks 230 and the lower inner tracks 235 in combination with the position of the wheels 260, 261 and 262 positioned between the associated tracks 230 and 235 maintain the mold carrier 70 in contact with the upper tracks 210 regardless of the angle of tilt of the conveyor system 205, the conveyor system 205 being constructed to maintain the mold carrier 70 in contact therewith during rotation of the mold carrier 70 for a full 360° revolution.

Figure 5:
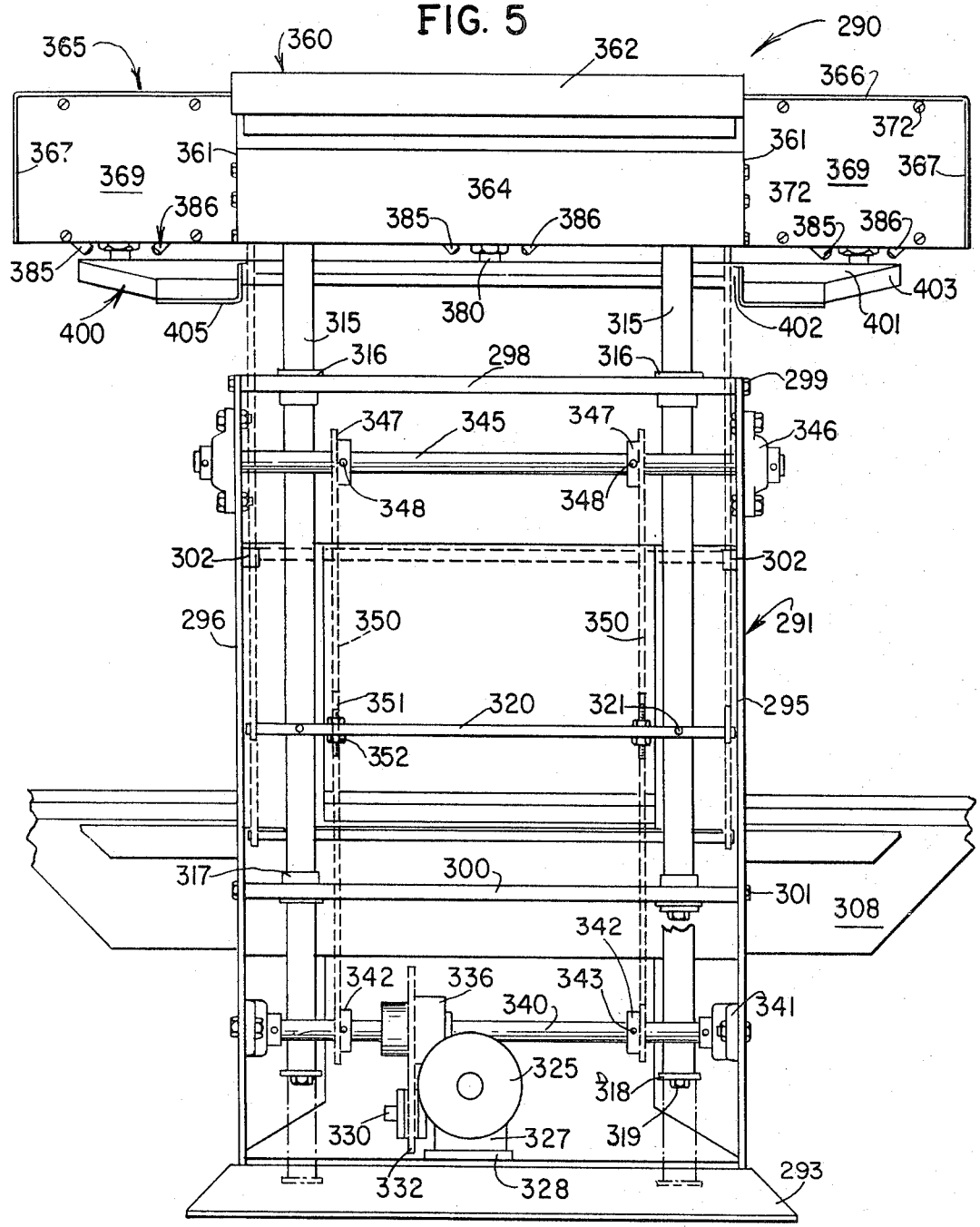
FIG. 5 is a rear elevational view of the filling station.
Figure 8:
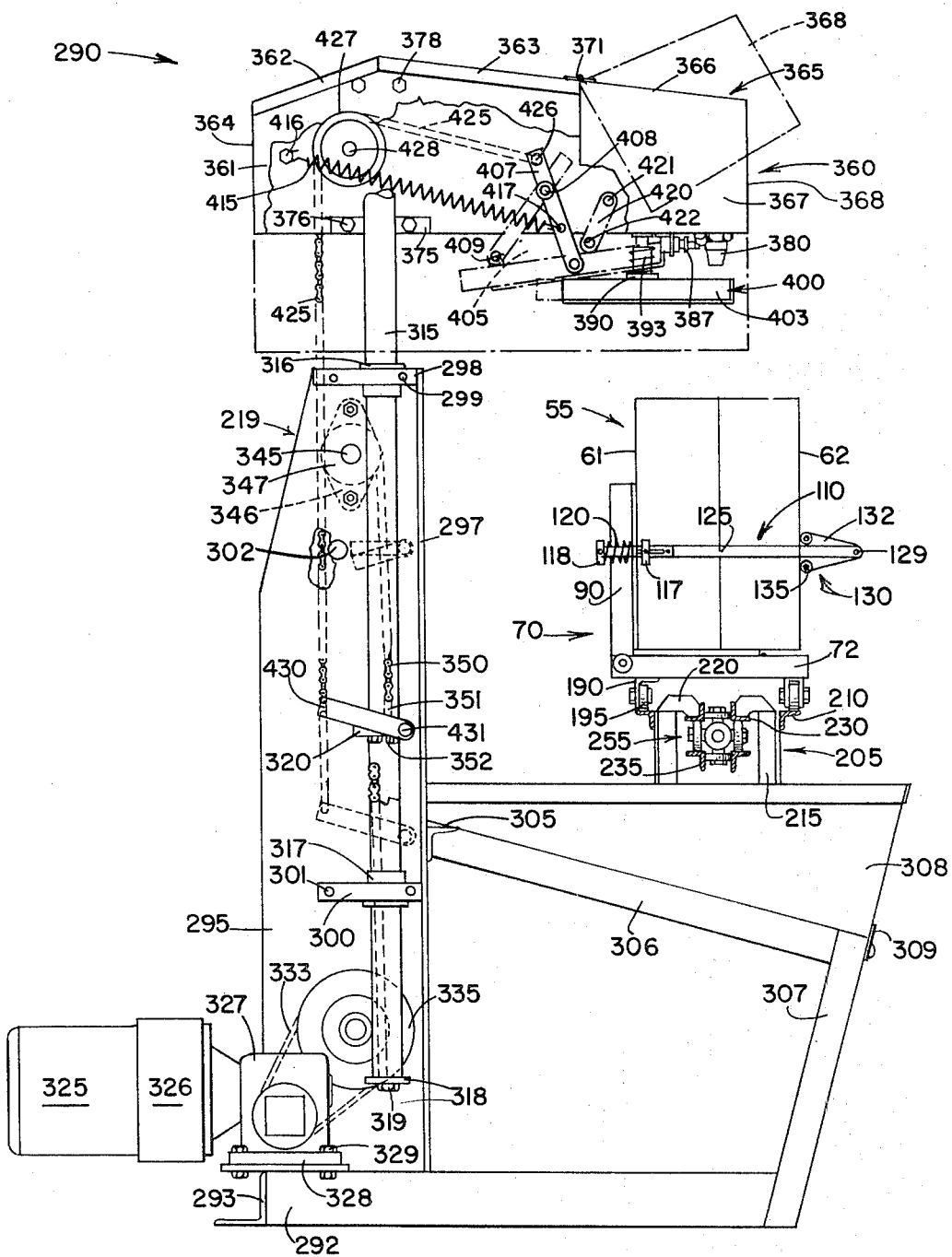
FIG. 8 is a side elevational view partly broken away of the filling station and particularly showing a mold in the liquid-receiving position thereof carried by a mold carrying means and maintained thereon by the mold clamping means.

As best seen in FIGS. 1, 5 and 8, the molds 55 each of which is carried by a mold carrier 70 are transported by the conveyor system 205 to the filling station 290 where each of the molds 55 is filled to a predetermined level with a liquid casting material which hardens in the molds 55 to form a casting therein. The liquid casting material or slip may be any art-recognized medium from a clay to a plastic resin. The filling station 290 includes a frame 291 having a base plate 292 formed at the rear thereof into an angle member 293. Two parallel spaced-apart upstanding side plates 295 and 296 are interconnected by a front plate 297. The construction of the side plates 295 and 296 with the front plate 297 is stabilized by an upper support shelf 298 suitably secured to the side plates 295 and 206 by fasteners 299 and a lower support shelf 300 suitably connected to the side plates 295 and 296 by fasteners 301. Two stops 302 are positioned opposite each other one on each of the side plates 295 and 296, the stops 302 being for a purpose hereinafter explained. There is further provided an angle iron 305 on the outside of the front plate 297, the angle iron 305 being horizontally disposed and generally parallel to the base plate 292. The angle iron 305 forms a support for two spaced-apart generally parallel support bars 306, the support bars 306 being connected at one end to the angle iron 305 and at the other end to a support bar 307, the support bar 307 being positioned at right angles to the support bar 306 interconnecting the support bar 306 with the base plate 292. The angle iron 305, support bar 306 and support bar 307 form a base for a drip pan 308 which rests on the frame or base formed thereby and against the front plate 297 of the frame 291, the drip pan 308 being prevented from sliding off of the support bar 306 by a retaining plate 309.

The filling station 290 further includes two main lift rods 315, the lift rods 315 are spaced apart and parallel, the rods extending vertically through upper lift rod bearings 316 maintained in the upper support shelf 298 and through lower lift rod bearings 317 maintained in the lower support shelf 300. Each of the main lift rods 315 has at the lower end thereof a lift rod end cap 318 and a fastener 319 connecting the end cap to the lift rod. Further, th lift rods 315 have a horizontally extending coupling plate 320 fixedly connected thereto by means of fasteners 321. The main lift rods 315 are vertically movable through the bearings 316 and 317 as shown by the differences in the solid-line position and the phantom-line position of the lift rods 315 in FIG. 5, the coupling plate 320 being fixedly connected to the lift rods 315 is also vertically movable as shown by the solid line position and the phantom line position thereof in the drawings.

Vertical movement of the main lift rods 315 and hence the coupling plate 320 is provided by a motor 325 having a brake 326 connecting thereto and leading to a gear reducer 327. The gear reducer 327 is mounted on a mounting plate 328 by a plurality of nuts and bolts 329 firmly connecting the gear reducer 327 and hence the motor 325 and brake 326 to the base plate 292 of the frame 291. An output shaft 330 from the gear reducer 327 is connected to a sprocket 332. A chain 333 interconnects the sprocket 332 with a sprocket 335 mounted to collar 336 and to drive shaft 340. The drive shaft 340 is journaled in bearings 341 suitably mounted on the respective side plates 295 and 296. The drive shaft supports two spaced-apart sprockets 342, each of the sprockets 342 being fixedly connected to the drive shaft 340 by set screws 343 to rotate with the drive shaft 340.

There is further provided an idler shaft 345 vertically spaced apart from the drive shaft 340 and parallel thereto, the idler shaft 345 being suitably journaled in idler shaft bearings 346 mounted on the respective side plates 295 and 296 of the frame 291. The idler shaft 345 supports two spaced-apart sprockets 347, each being fixedly mounted on the idler shaft by set screws 348, each of the sprockets 347 being vertical alignment with an associated one of the sprockets 342. Each of the associated sprockets 342 and 347 is interconnected by a chain 350, each of the two chains 350 having tensioning screws 351 and nuts 352 connecting the chains 350 with the coupling plate 320 and maintaining sufficient tension in the chains 350 to maintain engagement of the chain links with the teeth of the individual sprockets 342 and 347. Therefore, it is seen that rotation of the drive shaft 340 by activation of the motor 325 results in movement of the chain 350 and hence vertical movement of the coupling plate 320 and the main lift rods 315 fixedly connected thereto.

Fixedly connected to the main lift rods 315 and vertically movable therewith is a filling head 360 movable between a dispensing position and a storage position, the filling head 360 including two spaced-apart parallel side plates 361 interconnected by a rearwardly diagonally extending top plate 362 and a forwardly diagonally extending top plate 363 and a vertically extending rear plate 364. A front cover 365 extends beyond the side plates 361 and includes a top plate 366 interconnecting two spaced-apart parallel end plates 367. The front cover 365 further includes a front plate 368 and associated end plates 367 with the side plates 361. The front cover 365 is hingedly connected to the forward top plate 363 as at hinge 371 to facilitate easy access to the filling mechanism housed within the front cover 365, the aforementioned top 366, end plates 367, front and rear plates 368 and 369 being assembled by suitable fasteners 372. A lower bracket 375 fixedly secures each of the main lift rods 315 to the filling head 360 by means of fasteners 376 and an upper bracket (not shown) fixedly secures each of the lift rods 315 to the filling head 360 by means of fasteners 378.

There is further provided a plurality of fluid nozzles 380 housed within the front cover 365 for introducing the liquid casting material or slip into the molds 55 when the molds are positioned in the liquid-receiving position thereof, as will more fully be explained hereinafter. While there is shown in the particular embodiment disclosed herein three spaced-apart fluid nozzles 380, it will be appreciated that less than or more than three of the fluid nozzles 380 may be housed within the filling head 360. The molds 55 are in the liquid-receiving position thereof when the opening 63 therein is in registry with one of the fluid nozzles 380, the associated mold carrier 70 being adjusted for each different sized mold 55 carried thereby so as to position the center of the opening 63 of the associated mold 55 in vertical alignment with the fluid nozzle 380. Each of the fluid nozzles 380, as particularly seen in FIG. 3, has connected thereto a valve 381 and is mounted to the filling head 360 by means of a mounting assembly 382, operation of the valve 381 permitting liquid casting material to flow through the nozzle 380 or preventing liquid casting material from flowing through the nozzle 380.

There is further provided a light source 385 and a photoelectric cell 386 for each of the nozzles 380, the light source 385 and photoelectric cell 386 being angularly mounted with respect to the associated nozzle 380 and adapted to actuate (in a manner hereinafter explained) the valve 381 when the liquid casting material or slip introduced into the associated mold 55 reaches a predetermined level to halt introduction of the liquid material thereinto. There is further provided a water nozzle 387 behind each of the fluid nozzles 380, the water nozzle being positioned in registry with the opening 63 in the associated mold 55 and having control mechanism (not shown) so as to introduce a layer of water on top of the liquid casting material or slip after the introduction thereof into the associated mold 55, for a purpose hereinafter explained. The filling head 360 is provided with two stop plungers 390, there being a stop plunger 390 mounted adjacent to each of the end plates 367. Each of the stop plungers 390 includes a slidable shaft 391 having an end cap 392 thereon and a coil spring 393 positioned thereabout to bias the stop plunger 390 to its fully extended position. When the filling head 360 is lowered, as hereinafter explained, the stop plunger 390 contacts the top surface 56 of an associated one of the molds 55 and compresses the plunger 390 until the slidable shaft 391 actuates a switch 395 which causes the motor 325 to stop and the brake 327 to engage.

The filling head 360 further is provided with a drip pan 400 movable between a collecting position, shown in full-line in FIG. 8, and a storage position, shown in phantom-line in FIG. 8. The drip pan 400 includes a front wall 401 and a back wall 402 spaced apart and parallel thereto, the front wall 401 and back wall 402 being interconnected by two parallel side walls 403 and a bottom wall 404. The drip pan 400 is further provided with two pan support brackets 405 each of which is positioned near an associated side wall 403 of the drip pan. A tray pivot arm 407 is pivotally mounted intermediate the ends thereof on each of the side plates 361 of the filling head 360 by a stub shaft 408. The lower end of each of the tray pivot arms 407 is pivotally mounted to the rear, that is the left-hand endmost portion as seen in FIG. 8, of the pan support bracket 405 by a pin 409. A coil spring 415 has one end thereof fixedly mounted on a bar 416 extending between the side plates 361 and suitably mounted thereto and has the other end thereof secured to a bar 417 interconnecting the two tray pivot arms 407, the coil springs 415 tending to bias the drip pan 400 into the storage position thereof. There is further provided two idler arms 420, each of the idler arms 420 having one end thereof pivotally connected to an associated side plate 361 by an idler arm stud 421 and having the other end thereof pivotally connected to the front end, that is the right-handmost end as seen in FIG. 8, of the pan support bracket 405 by a pin 422. There is further provided two chains 425 each of which is mounted by a pin 426 to the other end of each of the tray pivot arms 407 and extends over an idler sprocket 427 rotatably mounted to the associated side plate 361 by a stub shaft 428 and then downwardly to a draw bar 430 pivotally connected to the outermost ends of the coupling plate 320 by a pin 431.

It is seen therefore that when the motor 325 is operative to drive the chain 333 in one direction and hence the drive shaft 340, the coupling plate 320 is moved upwardly thereby also to move therewith the main lift rods 315. When the main lift rods 315 are moved to their uppermost position, the filling head 360 moves therewith to the storage position thereof and as the draw bars 430 move upwardly and contact the stops 302, further movement of the draw bars 430 is prevented thereby and the effective length of the chains 425 is changed, thereby to pivot the tray pivot arms 407 about the stub shafts 408 against the pull of the springs 415 to move the drip pan 400 from the storage position thereof to the collecting position thereof in which the drip pan 400 is in position to catch any of the liquid material or slip which may drip from the nozzles 380. When the molds 55 are moved into the liquid-receiving position thereof by the conveyor system 205 and the mold carriers 70, the motor 325 is activated to rotate the drive shaft 340 in the opposite direction thereby to lower the main lift rods 315 and hence the movable plate 320 are lowered, the draw bars 430 disengage from the stops 302 and are free to rotate about the pins 431 to their full-line position as shown in FIG. 8, thereby to allow the springs 415 to draw the drip pan 400 rearwardly into its storage position and away from the nozzles 380. The filling head 360 proceeds downwardly in response to operation of the motor 325 until the stop plungers 390 contact the top surface 56 of a mold 55 thereby actuating the switches 395 to stop the motor and apply the brake to prevent further downward movement of the filling head 360. When the filling head 360 has reached its lowestmost position, as seen in the phantom-line position of FIG. 8, the filling head 360 is in the dispensing position thereof and the valves 381 are actuated to dispense liquid casting material or slip through the nozzles 380 into the associated molds 55 until the liquid level in the molds is such to cause the light source 385 and photoelectric cells 386 to again actuate the valves 381 to halt the flow of the liquid casting material through the nozzles 380, the photoelectric cell being set to receive reflected light of sufficient intensity when the liquid level is about ⅜ inch from the top of the mold. Thereafter, water is introduced into the associated molds 55 through the water nozzles 387, the water flowing thereinto for a predetermined time after which a valve (not shown) is actuated to halt the same.

After the molds 55 are filled to the predetermined level with the liquid casting material or the slip and thereafter have a predetermined amount of water deposited on top of the liquid casting material and the filling head 360 has been returned to the storage position thereof, the filling molds 55 are moved by the conveyor system 205 away from the filling station 290 into the wall building station 440. The wall building station 440 is an enclosed area about a section of the conveyor system 205 in which an inlet air duct 441 and an outlet air duct 442 are provided in order to circulate air at a predetermined temperature and humidity more rapidly to effect formation of a casting within each of the molds 55 by accelerating the absorbtion of water from the liquid casting material through the mold 55 and evaporating the water from the mold walls into the controlled atmosphere of the wall building station 440. The water introduced on top of the liquid casting material is sufficient to prevent formation of a solid coating across the opening 63 in the top surface 56 of the molds 55 during transportation through the wall building station 440, thereby to permit the excess liquid material to be drained or dumped from each of the molds 55, all as hereinafter explained.

As each successive series of three molds 55 is filled in the filling station 290, the conveyor system 205 moves the molds 55 along the closed path in a counterclockwise direction as viewed in FIG. 1. The desired wall thickness of the casting formed in each of the molds 55 is determined by the temperature and humidity of the air circulated within the wall building station 440, the length of time the molds 55 reside therein and the length of time before the excess material is dumped therefrom. Upon leaving the wall building station 440, the molds 55 are transported by the conveyor system 205 through a twisting station 445 in which the conveyor system 205 is tilted at a slight angle of about 10°, so as to reposition the vertical axis of the molds 55 with respect to the true vertical. After the molds 55 pass through the twisting station 445, they enter the inverting station 450.

Figure 9:
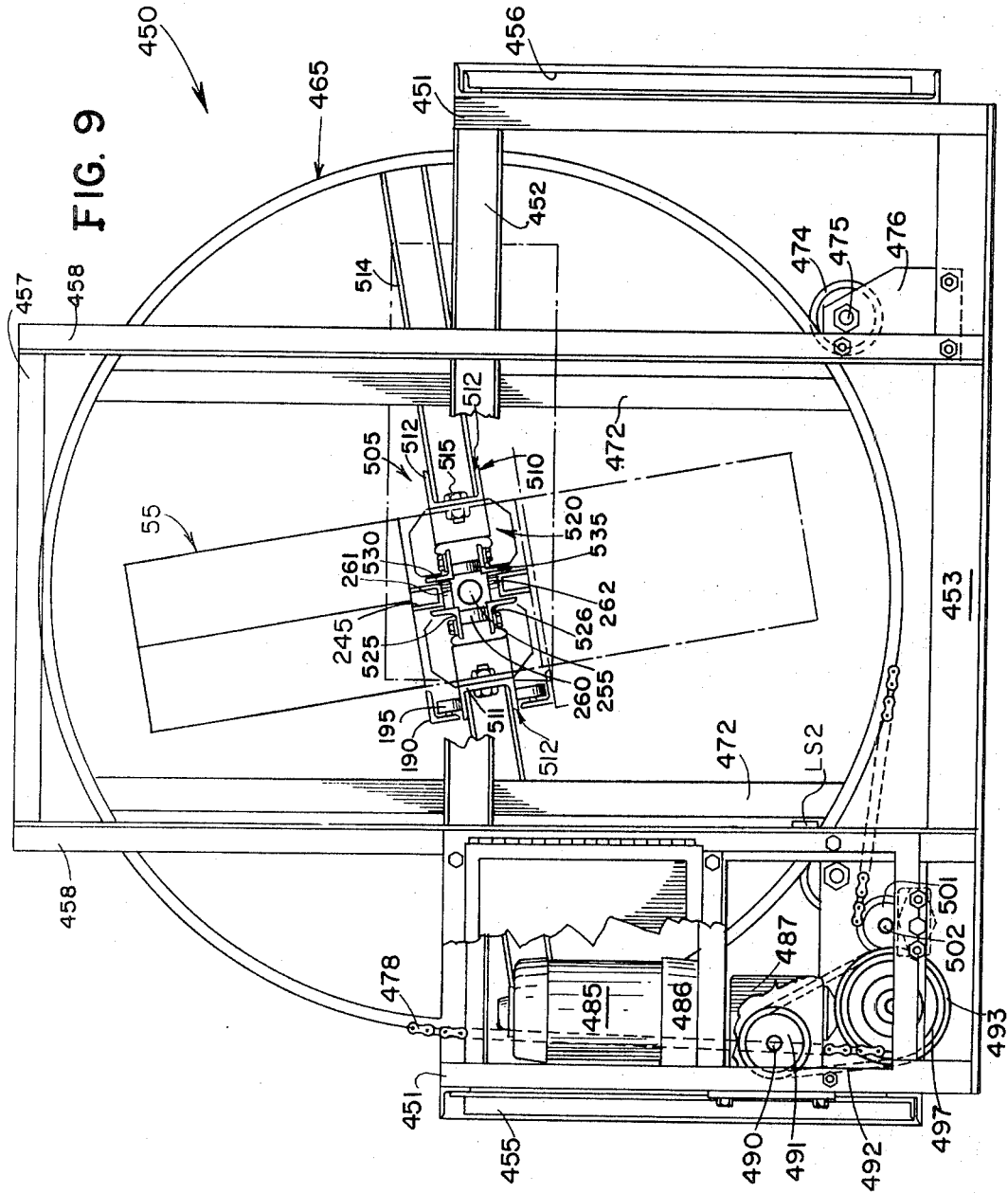
FIG. 9 is an end elevational view of the inverting and uprighting means and showing in phantom the various positions of the molds therein.
Figure 10:
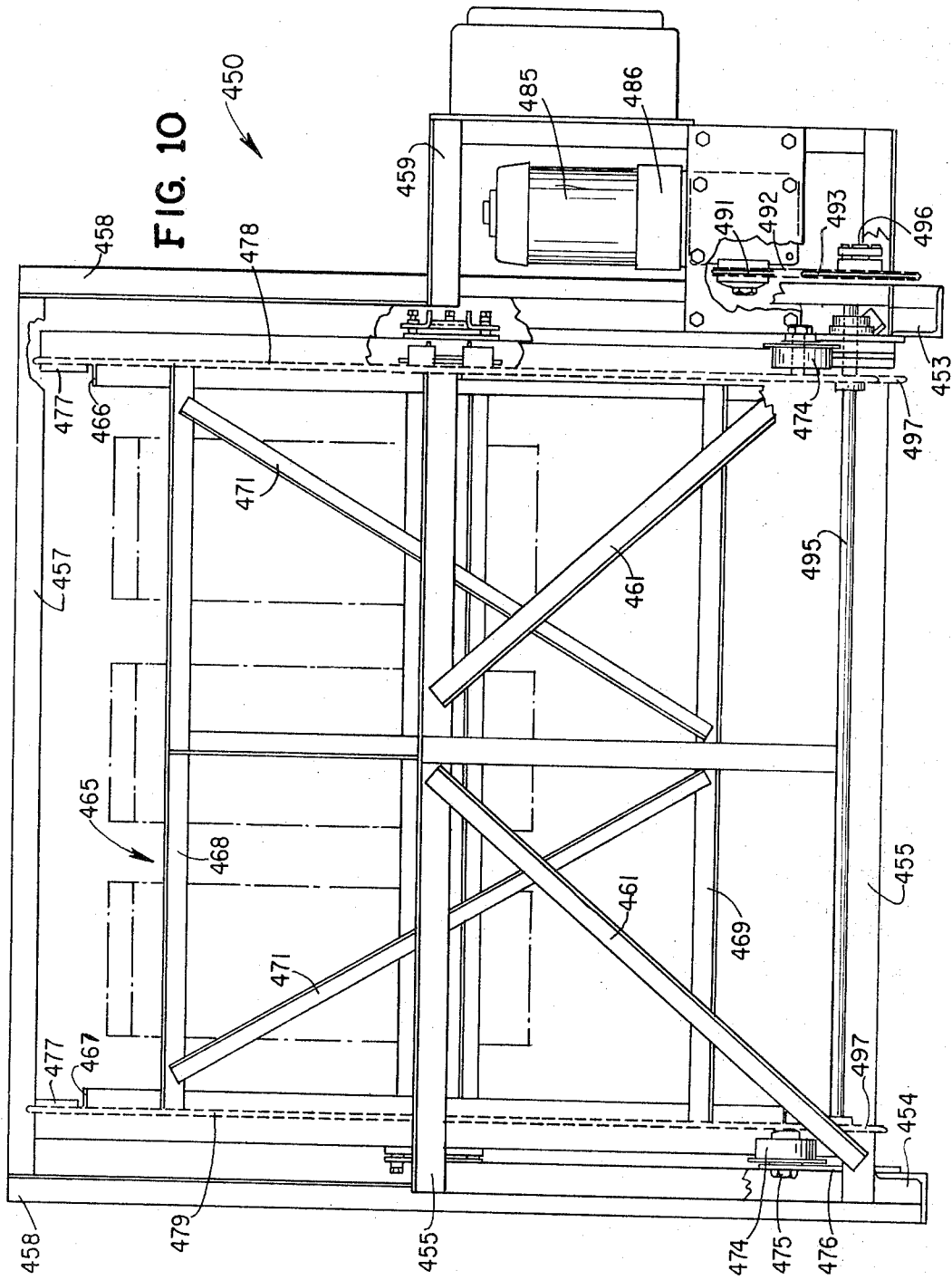
FIG. 10 is a side elevational view partly broken away of the inverting and uprighting means.

The inverting station 450 includes a pair of vertical supports 451 spaced apart and extending substantially vertically upwards and interconnected at the front and rear ends thereof by a track holding support 452. The bottom of the vertical supports 451 are joined by a front base angle iron 453 and a rear base angle iron 454 and two side frames 455 and 456. A top frame 457 interconnects two end frames 458 which end frames 458 are connected to the front and rear base frames 453 and 454. A motor mounting frame 459 is suitably connected to the side frame 455 and the vertical supports 451, all as shown particularly in FIGS. 9 and 10. A plurality of diagonal struts 461 interconnect portions of the side frames 455 and 456 to complete the frame for the inverting station 450.

The inverting station 450 further includes a rotor 465 formed of two spaced-apart parallel circular end frames 466 and 467, the end frames 466 and 467 each being in the form of a hoop and being interconnected one to the other by side braces 468 and 469. Diagonal side braces or struts 471 interconnect the side braces 468 and 469 and two spaced-apart and parallel end braces 472 provide support for the end frames 466 and 467, the end braces 472 being positioned as cords of the circle formed by the end frames 466 and 467. The rotor 465 is supported within the frame of the inverting station 450 by four trunion idlers 474, each of the trunion idlers 474 being freely rotatable on a shaft 475 suitably secured in a mounting plate 476 to the associated end frame 458. The circular end frames 466 and 467 of the rotor 465 each carry on the periphery thereof a plurality of spaced-apart gear segments 477, the gear segments 477 serving to engage respectively a chain 478 positioned around the circular end frame 466 and a chain 479 positioned around the circular end frame 467.

The inverting station 450 is further provided with a variable speed motor 485, a brake 486 connected thereto and a gear reducer 487 receiving the output shaft from the motor 485. An output shaft 490 from the gear reducer 485 has fixedly mounted thereon a drive sprocket 491 for rotation therewith. A large sprocket 493 is driven from the drive sprocket 491 by means of a drive chain 492 interconnecting the drive sprocket 491 and the large sprocket 493. A drive shaft 495 is journaled in bearings 496 and supports the large sprocket 493 which is fixedly secured thereto, thereby to rotate the drive shaft 495 in response to rotation of the output shaft 490 of the gear reducer 487, which gear reducer 487 is connected to the motor 485. A sprocket 497 is spaced from the large sprocket 493 and also fixedly is mounted on the drive shaft 495 for rotation therewith, there being two sprockets 497 one each respectively positioned in alignment with the end frames 466 and 467 and the chains 478 and 479 carried thereby, the chains 478 and 479 respectively extending about the end frames 466 and 467, the gear segments 477 carried thereby and the sprockets 497, thereby to effect rotation of the rotor 465 in response to rotation of the drive shaft 495. There are also provided two idler sprockets 501, each of which is mounted for free rotation about a shaft 502, the idler sprockets 501 having the respective chain 478 and 479 passing therearound after the chain leaves the associated sprocket 497. A limit switch LS2 mounted on the frame 459 serves to control the motor 485 after the rotor 465 has rotated through a predetermined arc.

The inverting station 450 further includes a conveyor track system 505 complementary to the track structure of the conveyor system 205, the track system 505 being positioned within the rotor 465 and fixedly secured thereto to rotate therewith. The conveyor track system 505 includes two spaced-apart outer tracks 510, the outer tracks 510 being U-shaped and having two parallel spaced-apart legs 512 interconnected by a bight 511. The outer tracks 510 are fixedly connected to support members 514 by fasteners 515, the support members 514 being suitably secured to the end frames 466 and 467. Further secured to the support members 514 by fasteners 515 are spaced-apart C-shaped support brackets 520, the support brackets 520 being of similar shape to the support brackets 220 except that they are open on top and bottom, the support brackets 520 have upper lugs 525 and lower lugs 526 extending transversely therefrom. L-shaped inner upper tracks 530 are fixedly secured to the upper lugs 525 of the support brackets 520 and inner lower tracks 535 are fixedly secured to the lower lugs 526 of the support brackets 520, thereby to provide a longitudinally extending track structure in the rotor 465 corresponding to the track structure of the conveyor 205. When a set of three molds 55 carried by the associated mold carrier 70 approaches the inverting station 450, the wheels 260 of the trolley assemblies 255 rest on the surfaces 212 of the outer tracks 210 of the fixed conveyor system. The outer tracks 510 of the rotor extend to within a short distance of the outer tracks 210 so that the trolley assemblies 255 and the wheels 260 carried thereby may pass easily from the outer tracks of the fixed conveyor 210 to the outer tracks 510 of the rotor 465.

As the conveyor system 205 and the complementary conveyor track 505 in the rotor 465 are designed to maintain the mold carriers 70 on the conveyors system 205 and the conveyor track system 505 during rotation of the conveyor system through a full 360° revolution, as hereinbefore described, once a plurality of molds 55 are positioned within the rotor 465, the motor 485 may be actuated to cause rotation of the rotor 465 and hence the molds 55 positioned therewithin. The ball and socket connection between the rods 278 and the cylindrical bodies 257 of the trolley assembly 255 allows for rotation of the molds 55 within the rotor 465 without corresponding rotation of the molds positioned on trolley assemblies 255 outside of the rotor 465. Once the molds 55 are positioned within the rotor 465, the motor 485 may be actuated in order to dump excess liquid casting material or slip by rotation of the molds 55 through any given number of degrees, the exact program followed in dumping the excess material from the molds 55 being dependent on various factors such as the clay material used, the size of the molds and other typical parameters. In a preferred embodiment, the molds 55 are rotated about 180° from the entrance angle thereof, which, as previously noted, is about 10° back from a true vertical. The 10° center of the molds is provided to assure that the mold walls won't bubble out during inversion and also prevents the formation of dimples on the inner bottom wall of the casting. After the dumping, the molds loose the station 450 and are transported through a second twisting station 570 in which the conveyor system 205 is spiralled about 10° in order to position the molds 55 in an upsidedown but true vertical position, the molds 55 having been spaced from the true vertical by a combination of the twisting station 445 and the inverting station 450. After the molds 55 pass through the second twisting station 570, they pass through a draining station 575, the draining station 575 being a sufficiently long stretch of the conveyor system 205 to permit excess liquid casting material or slip completely to drain from the molds 55.

From the draining station 575 the molds 55 are transported to an uprighting station 580, the uprighting station 580 being similarly constructed to the inverting station 450 so that a detailed illustration thereof is omitted for purposes of brevity. FIG. 2 schematically illustrates the uprighting station having a housing 581, a rotor assembly 582 driven by a drive mechanism 583. In the uprighting station 580 the molds 55 are returned to the upright position thereof by rotation of the rotor assembly 582 through an arc of about 180°. Upon exiting from the uprighting station 580, the molds 55 are transported through a part drying station 585.

The parts drying station 585 is formed of an enclosed portion of the conveyor system 205 which provides a controlled atmosphere therein, the enclosed portion having an inlet air duct 586 and an exhaust air duct 587 to circulate air having controlled temperature and velocity through the parts drying station 585, thereby indirectly controlling the humidity therein. In the parts drying station 585, the castings which have been formed in the molds 55 are dried to a condition of firmness so that thereafter they can be removed from the molds 55, it being understood that the castings initially are soft and wet and are dried in the parts drying station 585 to the required firmness and dryness so that they will not be damaged upon the removal thereof from the molds 55.

From the parts drying station 585 the conveyor system 205 transports the molds 55 to the mold unloading station 590, the conveyor system 205 being spiralled or tilted in the mold unloading station 590 to position the molds at an angle of about 10° from the vertical and away from the operator who manually unloads the castings formed within the molds 55. The castings are removed from the molds 55 by manipulation of the mold clamps 110 or 150 from the closed position thereof to the opened position thereof thereby to maintain the molds 55 in the casting-releasing condition thereof followed by manual removal of the front half of the individual molds 55 to facilitate removal of the castings formed within the mold 55. After the casting has been removed from the individual mold, the front half thereof is reassembled and the mold clamps 110 or 150 are moved from the opened position thereof to the closed position thereof to maintain the mold in the casting-holding condition thereof.

After the molds 55 have been returned to the casting-holding condition thereof they are transported by the conveyor system 205 from the mold-unloading station 590 to the moldconditioning station 595. The mold conditioning station 595 is an enclosed area about a section of the conveyor system 205 to provide a controlled atmosphere therein, the mold conditioning station 595 including an inlet air duct and an exhaust air duct for the introduction of air at a controlled temperature, humidity and velocity into the mold conditioning station 595 and for the removal of the moisture-laden air therefrom. A control panel 598 is provided for the control circuit hereinafter described, which control panel includes means for adjusting the aforementioned parameters to provide the molds 55 exiting from the mold conditioning station 595 with a controlled moisture content.

In operation, the individual molds 55 are mounted on the associated mold carrier 70 by fixedly securing the rear half 66 of the individual molds to the mold carrier 70 by means of the fasteners 105. Molds having heights from about 12 inches to about 20 inches and bases from about 7¾ inches square to about 12 inches square can be accommodated by the mold carriers herein described, it being understood however, that the operating principle of the automatic casting machine 50 hereinbefore described is applicable to molds of much greater or much smaller size, only the preferred mold sizes being set out herein. It is desirable that the three molds 55 being filled at the filling station 290 be the same height and to this end it is convenient to index the conveyor system 205 to move increments of three molds 55 during each successive movement of the conveyor system 205. It is understood that while the filling station 290 herein disclosed is adapted simultaneously to fill three molds 55 and the conveyor system 205 herein described is adapted to transport the molds 55 in increments of three so as to position three empty molds 55 at the filling station at one time and to transport three filled molds 55 from the filling station at one time and also to transport three filled molds at one time in the inverting station 450 and three drained molds at one time in the uprighting station 580, the casting machine 50 may be so adapted to accommodate greater or fewer numbers of molds 55 per incremental operation.

Once the rear half 66 of each of the individual molds 55 has been mounted to the associated mold carrier 70, the front half 65 of the mold 55 is placed in position and the associated mold clamp 110 or 150 is moved from the opened position thereof to the closed position thereof to effect change of the mold 55 from the casting-releasing condition thereof to the casting-holding condition thereof. The mold clamp 110 or 150 is moved from its opened position thereof to its closed position thereof in a similar manner and therefore only the operation of the mold clamp 110 will hereinafter be described. To move the mold clamp 110 from the opened position to the closed position thereof, the roll pin 128 and handle 139 and grasped and rotated by the operator to compress the springs 120 and to move the roller assembly 130 to the left as viewed in FIG. 13. Once the springs 120 are under sufficient tension so that the roller assembly 130 may be positioned with both the upper roller 134 and the lower rollers 135 forming a plane parallel to the front surface 62 of the associated mold 55, the springs 120 are allowed to move the roller assembly 130 to the right into contact with the front surface 62 of the mold 55 thereby sealably to compress the front half 65 of the mold with the rear half 66 thereof, whereby the mold 55 assumes its casting-holding condition when the mold clamp 110 is in its closed position.

After the molds 55 have been thus assembled on the associated mold carrier 70, they are transported through the mold conditioning station 595 and are subjected to air at a temperature from about 170°F. to about 180°F. and at a velocity of up to about 1,700 cubic feet per minute to dry the molds 55. Thereafter the conditioned molds 55 are transported to the filling station 290, the transportation of the molds 55 by the conveyor system 205 being provided by the drive mechanism 270.

While it is clear that different sized casting machines 50 may be provided each having different numbers of mold carriers 70, in an actual construction, 186 mold carriers 70 are provided, each taking an elapsed time of about 1½ hours for the entire cycle. When the molds 55 are transported to the filling station 290, three of the molds 55 are positioned in the liquid-receiving position thereof in which the opening 63 to the mold cavity of each mold 55 is in alignment with an associated fluid nozzle 380 so as to be in position to receive liquid casting material flowing from the fluid nozzle 380. When three of the molds 55 are in the liquid-receiving position thereof and the indexing of the conveyor system 205 is completed, the filling station control circuit is activated to begin the filling cycle in which the filling head 360 is lowered upon activation of the motor 325 as hereinbefore disclosed until the stop plungers 390 contact the top surface 56 of the mold 55 to halt the lowering of the filling head 360. The liquid level control circuit is also activated so that when the liquid casting material introduced into the mold 55 from the fluid nozzle 380 reaches a predetermined level, the valve 380 is actuated to halt the flow of liquid casting material through the nozzle 380. When all of the three valves 381 have been closed, a time delay control is actuated and simultaneously a valve (not shown) for the three water nozzles 387 is actuated to allow a predetermined quantity of water to flow into each of the three molds 55, thereby to provide a layer of water over the top of the liquid casting material therein. After a predetermined time, the time delay control again actuates the valve controlling the flow of water through the nozzles 387 and a signal simultaneously is sent to actuate the motor 325 to raise the filling head 360 to its storage position, the drip pan 400 automatically moving from its storage position to its collecting position so as to prevent liquid casting material from dripping from the nozzles 380 and onto the conveyor mechanism disposed therebelow. The filling station 290 is now in condition to accommodate the next three molds 55 to be transported into the liquid-receiving position thereof during the next indexing of the conveyor system 205. While the liquid level control herein described is a photoelectric system, a fluidic or conductive system may be used.

After the molds 55 filled at the filling station 290 are moved away therefrom by the indexing of the conveyor system 205, the newly filled molds 55 enter the wall-building station 440 and are there subjected to air maintained at a temperature from about 170°F. to about 180°F. with a velocity at the inlet to the wall building station 440 being at a rate of about 800 cubic feet per minute. The wall building station 440 is of sufficient length and operated under specified conditions to produce a preselected casting wall thickness. The actual construction of the wall building section is about 80 feet in length and the casting wall thickness produced therein is about 3/16 inch, the individual molds 55 remaining in the wall building station for a period of time of about During transportation of the molds 55 through the wall building station 440, the layer of water on the top of the liquid casting material in the mold cavity prevents a solid skin from being built up across the opening 63 in the mold which would prevent dumping of the liquid material from the mold.

As the molds 55 leave the wall building station 440, the conveyor system 205 is spiraled to a slight extent so that the molds 55 are carried at a few degrees from the vertical, the extent of this tilting of the molds 55 being between about 5° and about 15°. The molds 55 are tilted in order to prepare them for dumping in the inverting station 450.

When the conveyor system 205 is again indexed, three molds 55 which are filled with the liquid material and have passed through the wall building station 440 and the twisting station 445 are moved into the inverting station 450. The conveyor track system 505 within the rotor 465 is angularly matched with the conveyor system 205 so that the trolley assemblies 255 carrying the filled molds 55 easily may pass into the rotor 465. At the completion of the indexing of the conveyor system 205, the inverting station control circuit receives a signal and actuates the motor 485 to rotate the rotor 465 approximately 100° to 105° to provide a fast dump of the excess liquid material in the molds 55, the excess liquid material falling into a reservoir (not shown) from which it is pumped back to the filling station 290. After a predetermined time, the motor 485 is again actuated in response to a signal from the inverting station control circuit to rotate the rotor 465 at a very slow speed until the molds 55 have completed a 180° turn from the angle at which they entered the inverting station 450. At the completion of the inverting, a signal from the inverting station control circuit indicates that the inversion has been completed and the molds 55 are ready to be removed therefrom.

In a constructional example, the inverting station 450 operates on a 90 second cycle in which about 12 seconds are taken to move the molds 55 into the rotor 465, about 3 seconds are taken to initiate the fast spill by rotating the molds the first 100°–105° of the turn, swinging them to a horizontal or slightly below horizontal position, the molds being maintained in the fast spill position for about 10 seconds, about 53 seconds are used to rotate the molds the final 75°–80° to complete the inverting thereof and the molds are maintained in the inverted position thereof for about 12 seconds, thereby to complete a 90 second cycle in the inverting station 450.

As the molds 55 leave the inverting station 450 in an upsidedown or inverted position, any slight amount of liquid material remaining in the mold is allowed to drain therefrom into a reservoir (not shown) from which it is collected and returned to the filling station 290. The molds 55 are transported through a second twisting station 570 in which the tracks of the conveyor system 205 are spiraled to return the molds 55 to the vertical position and thereafter the molds 55 are transported by the conveyor system 205 in the vertical inverted position thereof through the draining station 575 to the uprighting station 580.

When the conveyor system 205 is again indexed three molds 55 in the inverted position thereof are positioned within the rotor 582 of the uprighting station 580 which rotates the molds 55 therein to the upright position upon actuation of the drive mechanism 583 by a signal from the control circuit therefor. Upon indexing of the conveyor system 205, the three molds 55 in the upright position thereof are transported from the uprighting station 580. After leaving the uprighting station 580, the molds 55 are thereafter transported to the parts drying station 585.

In a constructional example, the air within the enclosed parts drying station 585 is maintained at a temperature of between about 170°F. and about 180°F., the air velocity at the inlet of the parts drying station is maintained at a rate of about 1200 cubic feet per minute and the parts drying station is about 80 feet in length. The castings within the molds 55 are generally soft and unfit to be removed from the molds 55 when the molds enter the parts drying station 585. Upon exiting the parts drying station 585, sufficient water has been removed from the castings to render them firm and dry enough to be removed from the associated mold 55 without injury to the individual castings. Upon exiting from the parts drying station 585, the individual molds 55 with the dried casting therein are transported to the mold unloading station 590.

The track of the conveyor system 205 in the mold unloading station 590 is spiraled so as to tilt the molds 55 about 10° away from the operator who manually removes the castings from the individual molds 55. By tilting the molds 55 in this fashion, the castings will be supported by the rear half 66 of the mold 55 when the front half 65 of the mold is removed, thereby preventing unnecessary breakage of the castings due to slippage thereof from the molds.

The molds clamps 110 or 150 are moved from the closed position thereof to the open position thereof by movement of the roller assembly 130 or 170 in the vertical direction away from the overcenter position thereof when the clamp is in the closed position thereof, thereby to release the tension in the coil springs 120 or 160 whereby the associated mold 55 is in the casting releasing condition thereof. After the casting has been removed from the mold 55, the associated mold clamp is moved from the opened position thereof to the closed position thereof and the mold is again in the casting-holding condition thereof. The mold 55 is transported to the mold conditioning station 595 where it is dried and put into condition to receive another batch of liquid material therein. The mold conditioning station 595 may be operated when the filling station 290, the inverting station 450, and the uprighting station 580 are not in operation, all as hereinafter will be explained.

Figure 14:
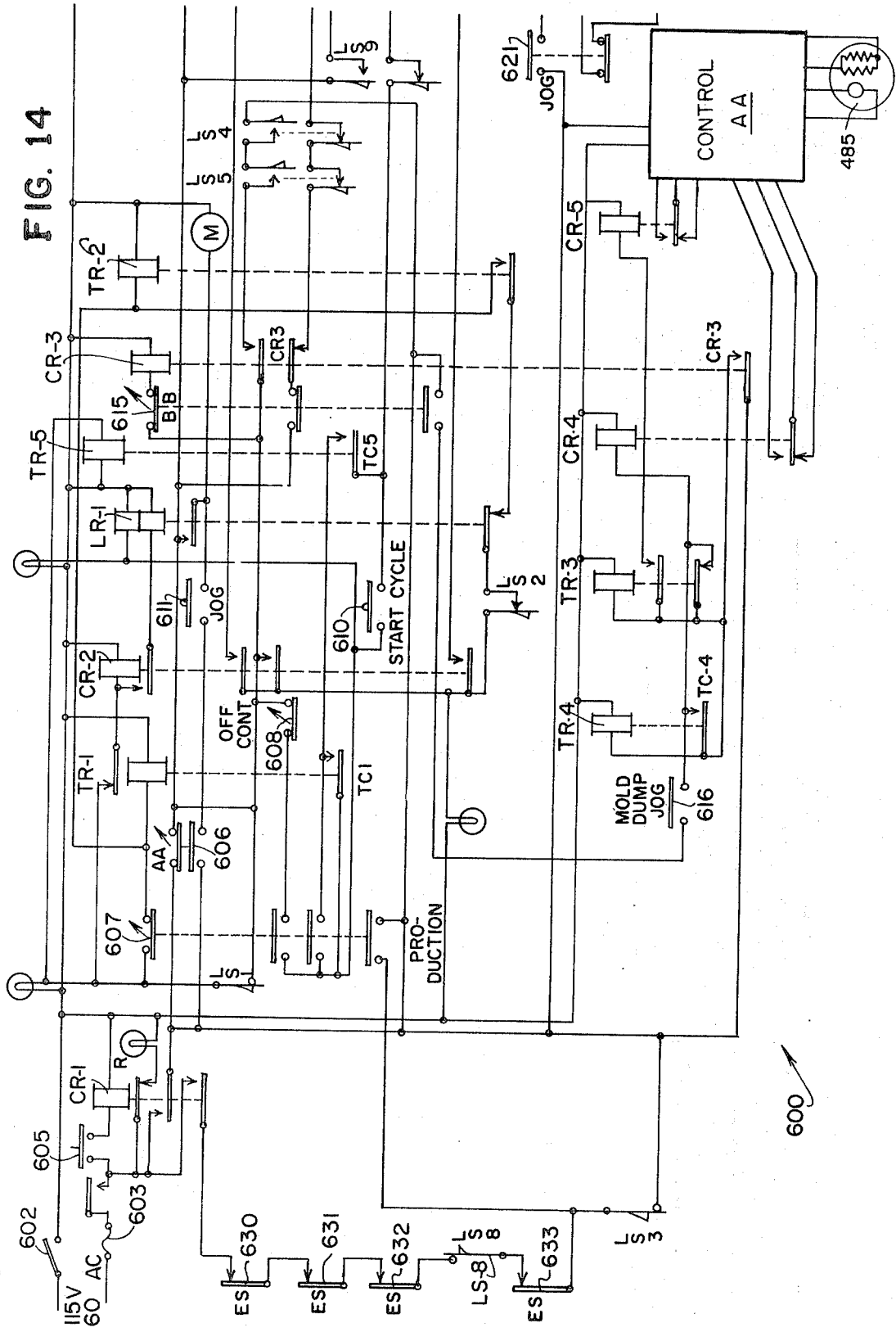
FIGS. 14 and 15 are electrical schematic and diagrammatic views of the control circuit for the automatic casting machine of the present invention.
Figure 15:
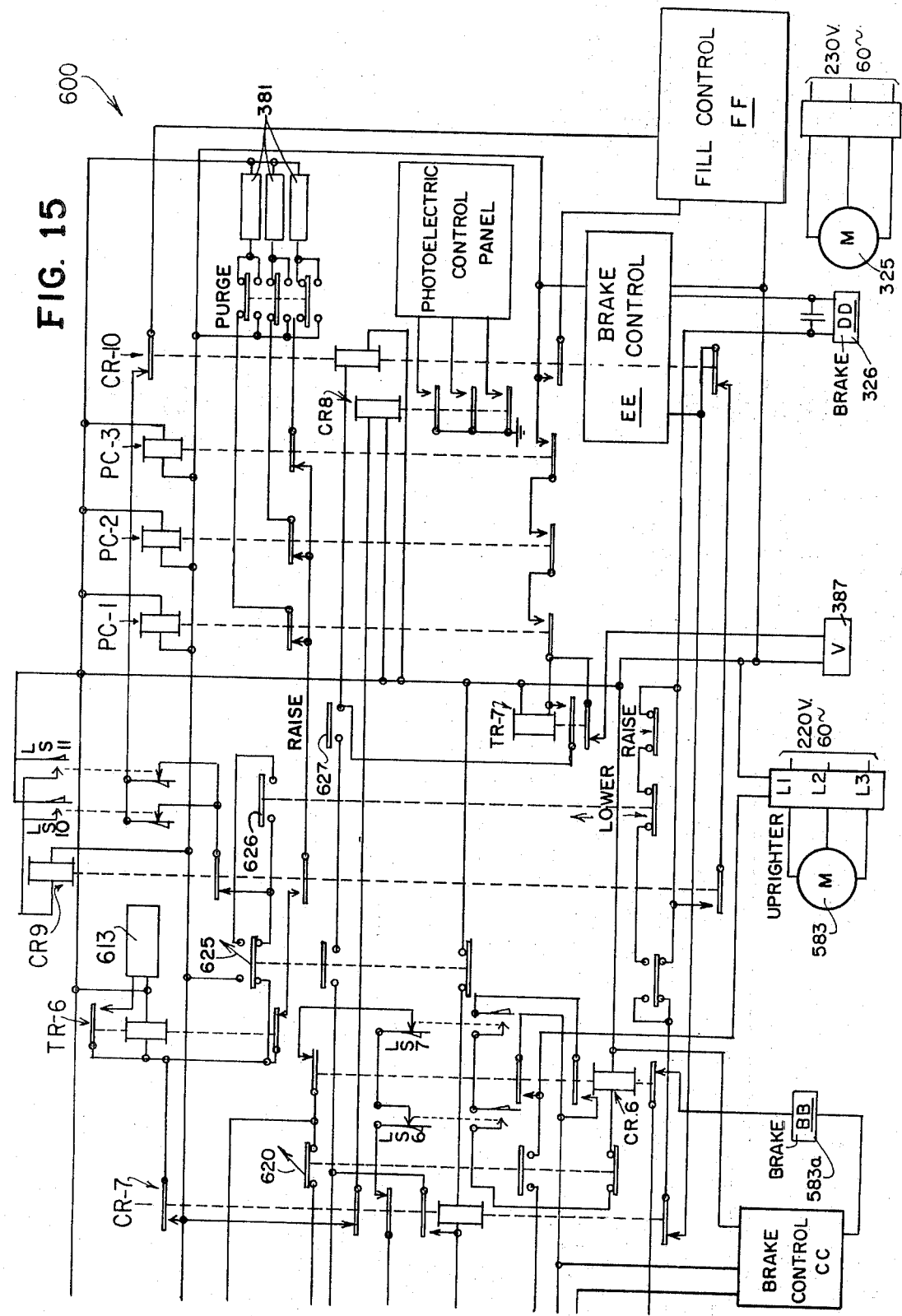

Referring now to FIGS. 14 and 15 of the drawings, there is illustrated a control circuit 600 for the operation of the automatic casting machine 50. At the far left-hand portion of FIG. 14 there is shown a 115 volt, 60 cycle, AC source, the 115 volt source having in one line thereof a main disconnect switch 602 and having in the other line thereof a fuse 603, the fuse 603 being provided for protection of the control circuit components. A control circuit reset push button 605 is located in a main control console (not shown), momentary actuation of the control circuit re-set push button energizing a control relay CR-1 which holds the control circuit 600 energized. A master selector switch 606 is also located in the main control console, the master selector switch 606 being movable between an automatic position in which the control circuit 600 is prepared for automatic operation and a hand position in which the control circuit 600 is prepared for manual operation at all stations. A cycle selector 607 is also located in the main control console and is movable between a production position in which the control circuit 600 is in condition for automatic production operation and a mold conditioning position in which the control circuit 600 is in condition to move the molds 55 through the mold conditioning operation. There is further provided an off-continuous selector switch 608 also located in the main console which provides for rapid continuous movement of the mold carriers 70 by moving the switch 608 in the continuous operating position, the cycle selector switch 607 being required to be in the mold condition position thereof. As illustrated, the master selector switch 606 is in the automatic position thereof, the cycle selector switch 607 is in the production position thereof and the off-continuous switch 608 is in the continuous position thereof.

There is further provided a start cycle push button 610 located in the main control console, actuation of an automatic production cycle being initiated by the pressing of this switch if all other systems equipment and automatic and production selector switches are in the proper positions thereof. A conveyor jog pushbutton 611 located in the main control console provides for manual movement of the mold carrier conveyor 205 only when the master selector switch 606 is in the hand position thereof. A latch relay LR-1 also located in the main control console operates the conveyor drive motor 271 through the contact of the latch relay LR-1 connected thereto. The other contact of the latch relay LR-1 serves to protect other operating units of the automatic casting machine 50 by breaking the control circuit when the latch relay LR-1 and subsequently the conveyor drive mechanism 270 is operating. A time delay relay TR-1 is located in the main control console and provides momentary actuation of a control relay CR-2 and subsequently the release coil of the latch relay LR-1. After a delayed interval, the time relay TR-1 closes the circuit to latch the coil of the latch relay LR-1 thereby preparing the circuit 600 to advance the conveyor system 205 after the operation at the filling station 290, the inverting station 450 and the uprighting station 580 have been completed. Finally, a time delay relay TR-2 is also located in the main console and momentarily delays the start impulses to the filling station 290, the inverting station 450 and the uprighting station 580 to give the conveyor drive mechanism 270 time to stop the molds 55 in the proper location with respect to the abovementioned operating stations.

The time delay relay TR-3 is located in the inverting station control cabinet (not shown), which time relay TR-3 is an adjustable time delay relay that controls the time period that the inverting drive mechanism 485 is operating at high speed. In essence, the time relay TR-3 determines the angle at which the molds 55 are momentarily stopped for the initial draining thereof. A contact of the time relay TR-3 operates a control relay CR-4 which starts and stops the drive motor 485 of the inverting station 450. Another contact of the time relay TR-3 operates the control relay CR-5 which determines the speed of the drive motor 485, the motor 485 being a variable speed motor operable between a high speed and a low speed. Another time relay TR-4 is also located in the inverting station control cabinet, which time relay TR-4 is also an adjustable time delay relay and controls the time period when the molds 55 are in a stopped position for initial draining thereof. A contact of the time relay TR-4 restarts the motor 485 through the control relay 4 after the time relay TR-4 has timed out.

A time relay TR-5 is located in the main control console, which time relay TR-5 is an adjustable time delay relay and controls the over-all casting cycle. The contact thereof being normally open and closes when the time relay TR-5 times out.

A time relay TR-6 is located in the filling station control cabinet (not shown), which time relay TR-6 is an adjustable time delay relay and provides a safety shut-off on the lines to the fluid valves 381. The time relay TR-6 is set to operate after a specified time interval which is slightly longer than the period normally required to fill the molds 55 having the largest cavities. If a malfunction occurs in the filling operation, the time relay TR-6 will time out and automatically shut off the line leading to the fluid valves 381, this being accomplished through a contact of the time relay TR-6. An alarm 613 is operated by another of the contacts of the time relay TR-6 if a malfunction of the fluid valves 381 occurs. Another time relay TR-7 is also located in the filling station control cabinet and controls the interval of time when water is being applied to the top of the casting fluid in the filled molds 55, the water passing through the water nozzle 387. One of the contacts of the time relay TR-7 operates the water valve and the other contact of the time relay TR-7 operates the drive motor 325 of the filling station 290 through a control relay CR10, as hereinafter explained.

The control relay CR-1 is located in the main control console, as hereinbefore stated, and energizes the control circuit 600 after the coil of the control relay CR-1 is momentarily energized by the control circuit reset button 605, the coil of the control relay CR-1 holding itself through its own contact. This circuit provides emergency stop protection to all stations, as hereinafter will be explained, another contact of the control relay CR-1 operating the red pilot light designated R and another contact of the control relay CR-1 powering the main control system.

Another control relay CR-2 is also located in the main control console and isolates the control circuits from each of the three operating stations, namely the inverting station 450, the uprighting station 580, and the filling station 290. The control relay CR-2 performs the above-stated function through its three normally open contacts connected to the respective control circuits, the control relay CR-2 also controlling the latch relay LR-1 through another normally open contact.

A control relay CR-3 is located in the inverting station control cabinet and is the primary control relay for that unit, one contact of the relay CR-3 holding the relay coil energized, another contact controlling the recycle circuit and another contact controlling the inverting station drive motor 485 through auxiliary contactors. A control relay CR-4 is also located in the inverting station control cabinet and serves as a start-stop control for the inverting station drive system including the motor 485. Another control relay CR-5 is also located in the inverting station control cabinet and determines the speed of the drive motor 485, the drive motor 485 being a variable speed motor as hereinbefore disclosed.

A control relay CR-6 is located in the uprighting station control cabinet (not shown) and serves as a control for the uprighting unit 580. A contact of the control relay CR-6 holds the relay coil thereof energized, another contact of the control relay CR-6 controls the recycle circuit, another contact of the control relay CR-6 controls the drive motor 583 and another contact of the control relay CR-6 controls the drive brake of the uprighting unit 580.

A control relay CR-7 is located in the filling station control cabinet (not shown) and serves as a primary control relay for the filling machine. One contact of the control relay CR-7 holds the relay coil thereof energized, another contact of the control relay CR-7 is part of the drive brake circuit which controls the drive brake 326, another contact of the control relay CR-7 is the main contact for the control system for the filling station 290, another contact of the control relay 7 controls the recycle circuit of the filling station 290 and a final contact of the control relay CR-7 operates a control relay CR-8 which "resets" the photoelectric controls each cycle for operating the photoelectric cells 386. A control relay CR-9 is also located in the filling station control cabinet and controls the drive motor 325 and brake 326 through a control relay CR-10.

A conveyor limit switch LS-1 is actuated by a cam (not shown) located on every third mold carrier 70, the conveyor limit switch LS-1 being mounted on the conveyor track below the mold carrier 70 immediately before the conveyor drive mechanism 270. The conveyor limit switch LS-1 completes its circuit which subsequently stops the mold carrier conveyor 205 and starts the operation at the filling station 290, the inverting station 450, and the uprighting station 580. A limit switch LS-2 senses the proper location of the molds 55 before starting the operation of the filling station 290, the inverting station 450, and the uprighting station 580, the limit switch LS-2 being mounted identically with the limit switch LS-1 except that the limit switch LS-2 is located immediately before the inverting station 450.

Another limit switch LS-3 is located on the conveyor track of the conveyor system 205 immediately after the inverting station 450, the function of the limit switch LS-3 being to detect a mold 55 leaving the inverting station 450 in its upright position. In a normal production cycle, the molds 55 should never leave the inverting station 450 in an upright position, and if this occurs, the limit switch LS-3 would be actuated and the control circuit de-energized. Two limit switches LS-4 and LS-5 are located in the inverting station 450 and operate in series, two circuits passing through the switches. One circuit controls the stopping of the drive motor 485 through the control relay CR-3 and the other circuit controls the recycling of the mold carrier conveyor 205.

Two limit switches LS-6 and LS-7 are located in the uprighting station 580 on the frame 581 thereof. These limit switches LS-6 and LS-7 perform the same function as the limit switches LS-4 and LS-5 situated in the inverting station 450. A limit switch LS-8 is mounted on the conveyor track of the conveyor system 205 immediately after the uprighting station 580 and de-energizes the main control circuit if a mold 55 leaves the uprighting station 580 in an inverted position.

A limit switch LS-9 is located in the filling station 290 and is actuated by the head frame 360 as the filling head travels to the storage position thereof. The limit switch LS-9 stops the filling cycle and signals the control circuit 600 to recycle. A pair of limit switches LS-10 and LS-11 operate in parallel to stop the lowering of the filling head 360 and to open the fluid valves 381, as will hereinafter be explained.

There is further provided in the control circuit 600 an inverter selector switch 615 located in the inverting station control cabinet, the selector switch 615 being movable between a manual or an automatic position. A mold inverter jog button 616 is provided which energizes the drive motor 485 when the push button 616 is depressed and the inverter selector switch 615 is in the manual position thereof. An uprighter selector switch 620 is located in the uprighting station control cabinet and is movable between a manual position and an automatic position. An uprighter jog button 621 is also provided which energizes the drive motor 583 at the uprighting station 580 when the jog button 621 is depressed and the uprighter selector switch 620 is in the hand position thereof. A filler selector switch 625 is located in the filling station control cabinet and is movable between manual and automatic positions. A filler head lower button 626 is provided to lower the filling head 360. The filling head 360 lowers in response to pushing the button 626 when the filler selector switch 625 is in the manual position thereof. A filler head raise button 627 is provided to raise the filling head 360. The filling head 360 is raised in response to actuation of the pushbutton switch 627 when the filler selector switch 625 is in the manual position thereof.

There further is provided photoelectric controls PC-1, PC-2 and PC-3 located at the filling station 290, the function of the photoelectric controls PC-1, PC-2 and PC-3 is to sense the level of the fluid in the molds 55 and operate the respective fluid valves 381 to "shut-off" the flow of casting material at the proper level in the molds 55. This function is performed by the normally closed contacts of the respective controls PC-1, PC-2 and PC-3. Other contacts of the controls PC-1, PC-2 and PC-3 are wired in series and control the water applicator circuit. Each photoelectric control PC-1, PC-2 and PC-3 has a reset circuit which must be grounded each cycle to reset the controls, which grounding is done through the control relay CR-8. There is further provided purges 1, 2 and 3 representing three pushbutton switches which give the operator manual control over the individual fluid line valve 381 and may be used when the filler selector switch 625 is in either the manual or the automatic position thereof to allow the operator to override the photoelectric controls PC-1, PC-2 and PC-3.

There further is provided four emergency stop switches 630, 631, 632 and 633, which emergency stop switches are in the form of pushbutton type switches and are located on or near the main control console, the filling station control cabinet, the inverting station control cabinet and the uprighting station control cabinet. Depressing any one of the emergency stop switches 630, 631, 632 and 633 de-energizes the control circuit 600 and stops all operating equipment. The motors and motor controls, brake and brake controls, shown in the control circuit 600 are standard equipment and may be varied to suit the particular requirements of the particular installation.

A sequential explanation of the operation of the automatic casting machine 50 and the control circuit 600 therefor for a production cycle will hereinafter be disclosed. The main disconnect switch 602 providing the 115 volt electrical service to the control circuit 600 is closed and thereafter the master selector switch 606 is placed in the hand position thereof, the cycle selector switch 607 is placed in the production position thereof and thereafter the control circuit reset pushbutton 605 is momentarily depressed which energizes the control relay CR-1. The control relay CR-1 holds itself energized through its contact and provides electrical energy to the entire control circuit 600 through another one of its contacts.

At this point, the operator must inspect all the equipment to determine if all of their components, that is, the filling station 290, the inverting station 450, and the uprighting station 580 as well as the mold carrier conveyor 205 are all in proper sequential position to start the automatic production cycle. The filling head 360 in the filling station 290 must be in the storage position thereof and the molds 55 within the inverting station 450 must be in an inverted or hanging position while the molds 55 within the uprighting station 580 must be in an upright position. All the molds 55 between the inverting station 450 and the uprighting station 580 must be in a hanging position. If the above conditions do not exist, the operator manually must operate the improperly positioned equipment until the above conditions are met. A final step which must be taken before placing the casting machine 50 in automatic production is to advance the mold carrier conveyor 205 in order to open the limit switch LS-1, which switch LS-1 is actuated by a button cam located on every third mold carrier 70. The conveyor system 205 can be manually moved forward by depressing the conveyor jog pushbutton 611 when the master selector switch 606 is in the hand position thereof. After the above preparations have been completed and with the master selector switch 606 being in the auto position thereof, the start cycle pushbutton 610 is momentarily depressed which activates the latch coil of the latch relay LR-1 to start the conveyor system 205, which system moves until one of the button cams located on every third one of the mold carriers 70 operates the limit switch LS-1, all as hereinbefore described.

Upon actuation of the limit switch LS-1, the control relay CR-2 is momentarily energized through the time delay relay TR-1. The duration of energization of the control relay CR-2 is determined by the time setting of time relay TR-1, which time setting should be about four seconds. A contact of the control relay CR-2 energizes the release coil of the latch relay LR-1, thereby stopping the conveyor drive 270. Thereafter, contacts from the control relay CR-2 momentarily close the start circuit to the filling station 290, the inverting station 450 and the uprighting station 580. Individual control circuits simultaneously start these units after a short delay as determined by the time relay TR-2, which time delay should be set at about two seconds. This time delay allows the mold carrier conveyor system 205 time to stop the molds 55 in the proper positions with respect to the above-mentioned stations and also prevents the above-mentioned stations from going into operation if the conveyor system 205 has failed to stop because of a malfunction.

As indicated above, the filling station 290, the inverting station 450 and the uprighting station 580 perform their work simultaneously and their control circuits will be described separately hereinafter. After each of these stations has completed its individual cycle, a recycle circuit to the main control system 600 is closed energizing the latch coil of the latch relay LR-1 and a new cycle is started. The recycle circuit is controlled by the inverting station selector switch 615, a contact from the control relay CR-3, limit switches LS-4 and LS-5, the uprighting selector switch 620, a contact from the control relay 6, limit switches LS-6 and LS-7, a contact from the control relay CR-7, the limit switch LS-9, a contact from the time relay TR-5 and a contact from the time delay relay TR-1.

An explanation of the control circuit for the mold filling station 290 follows. A two second impulse is received from the main control console which energizes the coil of control relay CR-7 which subsequently holds itself energized through one of its contacts and through limit switch LS-9 which closes as the filling head 360 moves to the dispensing position thereof. With the control relay CR-7 energized, power is delivered to the motor control for lowering the filling head 360. This circuit passes through a contact of the control relay CR-7, the filling station selector switch 625, limit switches LS-10 and LS-11, a contact of control relay 9 and a contact of control relay 10. When the filling head 360 reaches the dispensing position thereof with three molds 55 positioned in the casting material receiving position thereof, the limit switches LS-10 and LS-11 are actuated, thereby breaking the circuit and halting the motor 325 which serves to move the filling head 360. A second circuit through the limit switches LS-10 and LS-11 energized the coil of the control relay CR-9 which subsequently energizes the motor brake 326 through a contact of the control relay CR-9. Another contact of the control relay CR-9 also closes and completes a circuit through a contact of the time relay CR-6 and the contact of the photoelectric controls PC-1, PC-2 and PC-3, which photoelectric controls are connected to the fluid valves 381. These fluid valves 381 open and the filling operation begins. As the fluid in the molds 55 rises, the fluid reflects a light into a light sensitive cell 386 of the individual photoelectric controls PC-1, PC-2, and PC-3, which light is reflected when the fluid in the mold 55 reaches a predetermined level. The photoelectric controls PC-1, PC-2 and PC-3 separately open the circuits to the respective valves 381, thereby stopping the flow of the fluid through that valve 381. These three controls also close the circuit to the coil of the time relay TR-7 and the water valve which dispenses water through the water nozzle 387. When the valve controlling the water nozzle 387 opens, water is transmitted therethrough to the surface of the fluid in the individual molds 55 for a time period as determined by the setting of the time relay TR-7, which time may be in the order of two or three seconds. After the time delay period, the time relay TR-7 times out and thereby energizes the control relay CR-10, which de-energizes the motor brake 326 through another contact of the control relay CR-10 and restarts the motor 325, thereby moving the filling head 360 to the storage position thereof. The filling head 360 moves until the limit switch LS-9 is actuated which de-energizes the control circuit and stops the motor 325. The time delay relay TR-6 serves as a safety control which automatically "shuts-off" the fluid valves 381 if a malfunction prevents them from filling or the photoelectric controls TC-1, TC-2 or TC-3 do not sense the fluid level in the molds 55 in a predetermined time. The control relay CR-8 resets the photoelectric controls PC-1, PC-2 and PC-3, each cycle by grounding an internal circuit.

An explanation of the control circuit for the inverting station 450 follows. A two second impulse is received from the main control console which energizes the coil of the control relay CR-3, which subsequently holds itself energized through one of its contacts and through limit switches LS-4 and LS-5 which close after the rotation of the rotor assembly 465 begins. With the control relay CR-3 energized, power is delivered to the drive motor 485 through a contact of the control relay CR-3 and a contact of the time delay relays TR-3, TR-4 and the control relays CR-4 and CR-5. The aforementioned timer and control relays are used to obtain the desired inverting sequence. With one of the contacts of the control relay CR-3 closed, the two timers TR-3 and TR-4 are energized and start timing. A normally closed contact of the time relay TR-3 energizes the coil of control relay CR-4 which starts the DC motor 485 in the higher speed thereof. Contacts of the control relay CR-5 in the closed position thereof determines the speed of the motor 485 to be either high or low. The time delay relay TR-3 operates its contact after a specified delay, one of which subsequently stops the operation of the motor 485. Another contact of time delay relay TR-3 closes and energizes the control relay CR-5 which switches the DC motor circuit from high to low speed after the molds 55 have rotated through about 100–105° of arc. However, the motor start control relay CR-4 will not restart the motor 485 until the time delay relay TR-4 has completed its cycle. As the slow speed phase of the inverting cycle brings the rotor assembly 465 to a one-half turn or 180° position from the start, the limit switches LS-4 and LS-5 are opened. The opening of these limit switches LS-4 and LS-5 de-energizes the control circuit and stops the motor 485 which completes the inverting cycle.

An explanation of the control circuit for the uprighting station 580 follows. A two second impulse is received from the main control console which energizes the coil of the control relay CR-6 which subsequently holds itself energized through one of its contacts and through limit switches LS-6 and LS-7, which close after the rotation of the uprighting station 580 begins. With the control relay CR-6 energized, a contact thereof starts the motor 583 through the motor control and another contact of the control relay CR-6 opens the brake circuit releasing the brakes, all as hereinbefore described with respect to the inverting station 450. The drive motor 583 rotates the uprighting station assembly 180° where it actuates the limit switches LS-6 and LS-7 which de-energize the uprighting station control circuit to stop the drive motor 583 and apply the brake which completes the uprighting station 580 cycle.

As previously indicated, the molds 55 may have excess moisture removed therefrom during the production cycle of the automatic casting machine 50 while passing through the mold conditioning station 595 or the moisture content of the molds may be reduced in a special mold conditioning cycle hereinafter explained. As the moisture content in the molds 55, which molds 55 may be made from plaster, will increase during normal production runs, the excess moisture must be removed to maintain good day-to-day casting performance. A mold conditioning cycle is built into the casting machine 50 to slowly and intermittently move the molds 55 through various heat zones, such as the wall building station 440, the parts drying station 585, and the mold conditioning station 595. A special mold conditioning cycle may be used during the long non-production periods such as evening hours or on those days when the machine 50 is not producing castings.

An operator can easily switch the equipment from a production cycle to a mold conditioning cycle by following the following procedure. As the mold conditioning cycle does not require operation of the inverting station 450, the uprighting station 580, or the filling station 290, the molds 55 are passed through the inverting station 450 and the uprighting station 580 in the upright position. Therefore, prior to the actuation of the mold conditioning cycle, the molds 55 in and between the inverting station 450 and the uprighting station 580 must be brought into an upright position. The mold conditioning cycle requires that the master selector switch 606 is positioned in the hand position thereof, which position gives the operator manual control over all of the system equipment to bring the equipment into the aforementioned upright position. The cycle selector switch 607 is placed in the mold conditioning position thereof and thereafter the master selector switch 606, the inverter selector switch 615 and the uprighter selector switch 620 are each moved into the automatic positions thereof. The conveyor system 205 will advance the molds 55 intermittently in sets of three as in the normal production cycle; however, the filling station 290, the inverting station 450, and the uprighting station 550 will not be activated because of the aforementioned condition of the various controls. The dwell between conveyor advances is determined by the setting on the total cycle timer relay CR-5.

Even in the mold conditioning cycle, the conveyor limit switch LS-1 continues to control the cycle, the button cams located on every third mold carrier 70 continuing to actuate the limit switch LS-1. The closing of the limit switch LS-1 energizes the release coil of the latch relay LR-1, which stops the conveyer system 205 as described in the production cycle. Simultaneously, the closing of the limit switch LS-1 and the energization of the latch relay LR-1 energizes the total cycle timer or the time delay relay TR-5. The energization of the time delay relay TR-5 closes a contact after a specified time delay to complete the circuit to the latch coil of the latch relay LR-1, thereby restarting the conveyor system 205 to complete the cycle. It should be noted that this start cycle also passes through switches in the filling station 290, the inverting station 450 and the uprighting station 580. These switches serve as safety switches because if these switches are opened due to a malfunction in the respective stations or a mislocation of machine components, the conveyor system 205 will not advance.

A third circuit is built into the control system 600, the third circuit permitting the operator to rapidly and continuously move the mold carrier conveyor system 205 without operating other units such as the filling station 290, the inverting station 450 and the uprighting station 580. This circuit is important and useful to the operator when mold changes are being made. The operator must first prepare the system for a mold conditioning cycle as hereinbefore described, then move the off-continuous selector switch 608 located in the main control console to its continuous position which completes a circuit directly to the latch coil of latch relay 1 which in turn operates the mold conveyor drive 270 and hence the conveyor system 205 continuously to move the molds 55.

Finally, as previously noted, the motor and brake components and controls depicted in the control circuit of FIGS. 14 and 15 are standard parts. Thus, the dumper motor designated AA, is a Boston Gear Company Ratiorol motor control No. V33. The brake designated as BB, is a Warner Brake No. EM-180-20, with the brake control CC being a Warner Model No. 5400-3; the motor control for the uprighter is an Allen Bradly No. 709-TOD and they are connected through contacts L1, L2, L3, to 220 volt, 60 cycle three phase service. The brake designated as DD is a Warner Model No. EM-50-20 with the brake controls designated EE being Warner Model No. 5400-3. Finally, the fill control motor, designated FF, is a standard Allen Bradley control No. 709-TOD, the motor 325 being connected to three phase electric service as noted.

From the foregoing it will be understood that there has been disclosed herein an automatic casting machine having numerous advantages. The system disclosed herein can be used for making hollow or solid ceramic, plastic, plaster and other types of castings wherein the raw material is in a liquid state. The relatively uniform control over the casting process greatly improves the mold life, that is, the number of times the molds can be used before they are worn out. It is estimated that molds used in connection with the system disclosed herein will have a mold life approximately four times that of molds used in the conventional hand method of making ceramic castings. The quality of the castings produced in accordance with the structure disclosed herein is greatly improved because of the controlled timing of the various operations and the fact that the operations are performed automatically and by machine, rather than based on human judgment. The mold clamps disclosed herein are particularly advantageous in that they afford fast and easy release and rapid close, thereby insuring that the system is substantially automatic, and, further, they are adjustable so that the system can be used with molds of various sizes. The mold-conditioning aspect of the system assures a uniform moisture content and temperature in the mold prior to introducing the casting material therein; the mold conditioning being vital to the casting operation. The inverting or turnover equipment disclosed herein provides greater control over the dumping of the molds than a hand operation. The twist section of the conveyor system disposed after the dumping section assures better drainage of the excess material than molds which are set in a perfectly perpendicular position; it reduces flow lines in the casting, reduces the possibility of the castings buckling, while at the same time precludes droplets from forming on the inside bottom of the castings.

While there has been described what is at present considered to be the preferred embodiment of the invention, it will be understood that various modifications may be made therein and it is intended to cover in the appended claims all such modifications as fall within the true spirit and scope of the invention.

What is claimed is:

1. A mold and clamp combination comprising a first mold part, a second mold part movable between a sealed position relative to said first mold part to place said mold in a casting material-receiving condition and an unsealed position relative to said second mold part whereby a hardened casting may be removed from said mold; a mold clamp including first fixed means secured to said first mold part, locking means movable between locked and unlocked positions relative to said second mold part for retaining said second mold part in the sealed position relative to said first mold part, and tensioning means for holding said locking means in the locked position thereof; said locking means comprising a pair of arm portions slidably mounted on said first fixed means on opposite sides of said first mold part, a pair of hinge members each pivotally connected at one end to the respective ends of said first arm portions, a connecting member rotatably secured to the respective outer ends of said hinge members, and a lock bar secured to said connecting member for rotation therewith relative to said hinge members, said lock bar being movable to a load-bearing position relative to said second mold part to hold said second mold part in the sealed condition relative to said first mold part, said first arm portions and said hinge members and said connecting member being arranged so that they lie in a common plane when said lock bar is in the loadbearing position with said tensioning means being operable to retain said connecting member and said arm portions and said hinge members in a stable position, rotation of said lock bar to a disengaged position relative to said second mold part requiring exertion of a greater force on said tensioning means before said hinge members and said connecting member can be rotated relative to said first arm portions, said greater force being obtained by rotation of said lock bar and said connecting member beyond the stable position thereof to effect a snap movement of said slidable first arm portions relative to said tensioning means.

2. The combination set forth in claim 1, wherein said locking means includes a pair of lock bars secured to said connecting member in fixed relation to each other, said lock bars being arranged such that when said lock bars are in the load-bearing position, they lie on opposite sides of the plane passing through said connecting member and said first arm portions and said hinge members.

3. The combination set forth in claim 1, and further including plate means interconnecting said pair of lock bars and said connecting member and further including a handle carried by said plate means for facilitating rotation of said lock bars and said connecting member between the locked and unlocked portions thereof.

4. The combination set forth in claim 1, wherein at least one of said hinge members includes a stop member thereon which prevents movement of said lock bar into the common plane of said pair of arms and said hinge members and said connecting member when said lock bar is in the load-bearing position.

5. The combination set forth in claim 1, wherein said tensioning means comprises at least one compression spring disposed about one end of one of said first pair of arms.

6. The combination set forth in claim 1, and further comprising a pair of said mold clamps fixedly secured to said first mold part and in spaced relations thereon.

7. The combination set forth in claim 1, wherein said first mold part is fixedly secured to a frame and said first fixed means comprises part of said frame, said frame including a base portion adapted to support the bottom surface of the associated mold.

8. The combination set forth in claim 7, wherein the fixed portion of said frame and said fixed mold part are adjustable relative to said base portion of said frame whereby said mold carrying means may accommodate molds of various sizes.

* * * * *